United States Patent
Nishio et al.

(10) Patent No.: US 12,439,424 B2
(45) Date of Patent: *Oct. 7, 2025

(54) COMMUNICATION APPARATUS AND COMMUNICATION RECEPTION METHOD

(71) Applicant: Sun Patent Trust, New York, NY (US)

(72) Inventors: Akihiko Nishio, Osaka (JP); Seigo Nakao, Kanagawa (JP); Ayako Horiuchi, Kanagawa (JP); Yasuaki Yuda, Kanagawa (JP); Sujuan Feng, Frankfurt (DE); Michael Einhaus, Darmstadt (DE)

(73) Assignee: Sun Patent Trust, New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/523,691

(22) Filed: Nov. 29, 2023

(65) Prior Publication Data

US 2024/0107548 A1 Mar. 28, 2024

Related U.S. Application Data

(63) Continuation of application No. 17/954,231, filed on Sep. 27, 2022, now Pat. No. 11,871,432, which is a (Continued)

(30) Foreign Application Priority Data

Sep. 7, 2010 (JP) .................................. 2010-199882
Jul. 12, 2011 (JP) .................................. 2011-153663

(51) Int. Cl.
*H04W 72/23* (2023.01)
*H04L 5/00* (2006.01)
*H04L 5/14* (2006.01)

(52) U.S. Cl.
CPC ............ *H04W 72/23* (2023.01); *H04L 5/0007* (2013.01); *H04L 5/0053* (2013.01); *H04L 5/0055* (2013.01); *H04L 5/14* (2013.01)

(58) Field of Classification Search
CPC ............ H04W 72/23; H04W 72/0446; H04W 72/232; H04L 5/0007; H04L 5/0053;
(Continued)

(56) References Cited

U.S. PATENT DOCUMENTS 9,119,196 B2    8/2015   Nishio et al.
9,295,037 B2    3/2016   Horiuchi et al.
(Continued)

FOREIGN PATENT DOCUMENTS

CN    101741442 A    6/2010
CN    101820669 A    9/2010
(Continued)

OTHER PUBLICATIONS

3GPP TS 36.211 V8.7.0, "3rd Generation Partnership Project; Technical Specification Group Radio Access Network; Evolved Universal Terrestrial Radio Access (E-UTRA); Physical Channels and Modulation (Release 8)," May 2009, 83 pages.
(Continued)

*Primary Examiner* — Hashim S Bhatti
(74) *Attorney, Agent, or Firm* — Seed Intellectual Property Law Group LLP

(57) ABSTRACT

Provided are a base station, whereby the erroneous detection of control information can be reduced, thereby preventing the degradation of the system throughput. A base station maps a downstream allocation control information unit, which is addressed to a terminal, to a first resource region, which can be used for any of a downstream control channel region and a downstream data channel region, or to a second resource region, which can be used only for the downstream
(Continued)

control channel, so as to transmit the downstream allocation control information unit. In the base station, a control unit establishes a scale of the PDCCH region, and a transmission region establishing unit establishes, on the basis of a scale value established by the control unit, a mapping region to which the DCI is mapped within the R-PDCCH region and the PDCCH region.

7 Claims, 14 Drawing Sheets

Related U.S. Application Data continuation of application No. 16/920,306, filed on Jul. 2, 2020, now Pat. No. 11,490,377, which is a continuation of application No. 16/140,155, filed on Sep. 24, 2018, now Pat. No. 10,743,300, which is a continuation of application No. 15/422,200, filed on Feb. 1, 2017, now Pat. No. 10,117,237, which is a continuation of application No. 14/800,299, filed on Jul. 15, 2015, now Pat. No. 9,596,678, which is a continuation of application No. 13/814,923, filed as application No. PCT/JP2011/004699 on Aug. 24, 2011, now Pat. No. 9,119,196.

(58) Field of Classification Search
CPC ....... H04L 5/0055; H04L 5/14; H04L 1/0038; H04L 5/0094; H04L 5/1469
See application file for complete search history.

(56) References Cited

U.S. PATENT DOCUMENTS

| | | | |
|---|---|---|---|
| 9,554,380 | B2 | 1/2017 | Horiuchi et al. |
| 9,596,678 | B2 | 3/2017 | Nishio et al. |
| 2001/0044391 | A1 | 11/2001 | Shiga et al. |
| 2008/0298224 | A1 | 12/2008 | Pi et al. |
| 2008/0304404 | A1 | 12/2008 | Lu et al. |
| 2009/0323614 | A1 | 12/2009 | Wang et al. |
| 2010/0329384 | A1 | 12/2010 | Kwak et al. |
| 2011/0007673 | A1 | 1/2011 | Ahn et al. |
| 2011/0044391 | A1 | 2/2011 | Ji et al. |
| 2011/0194412 | A1 | 8/2011 | Park et al. |
| 2011/0205973 | A1 | 8/2011 | Ogawa et al. |
| 2011/0235603 | A1 | 9/2011 | Cheng et al. |
| 2011/0286413 | A1 | 11/2011 | Nishio et al. |
| 2012/0063386 | A1* | 3/2012 | Park ............... H04L 27/2602 370/315 |
| 2013/0010674 | A1 | 1/2013 | Iwamura et al. |
| 2013/0136095 | A1* | 5/2013 | Nishio ............... H04L 5/0053 370/329 |
| 2013/0148623 | A1* | 6/2013 | Nishio ............... H04L 1/004 370/329 |

FOREIGN PATENT DOCUMENTS

| | | |
|---|---|---|
| JP | 2011142595 A | 7/2011 |
| WO | WO 2010050221 A1 | 5/2010 |
| WO | WO 2010076300 A1 | 7/2010 |
| WO | WO 2010087177 A1 | 8/2010 |
| WO | WO 2011112681 A1 | 9/2011 |
| WO | WO 2013022272 A2 | 2/2013 |

OTHER PUBLICATIONS

3GPP TS 36.212 V8.7.0, "3rd Generation Partnership Project; Technical Specification Group Radio Access Network; Evolved Universal Terrestrial Radio Access (E-UTRA); Multiplexing and channel coding (Release 8)," May 2009, 60 pages.
3GPP TS 36.213 V8.7.0, "3rd Generation Partnership Project; Technical Specification Group Radio Access Network; Evolved Universal Terrestrial Radio Access (E-UTRA); Physical layer procedures (Release 8)," May 2009, 77 pages.
3GPP TS 36.213 V9.2.0, "3rd Generation Partnership Project; Technical Specification Group Radio Access Network; Evolved Universal Terrestrial Radio Access (E-UTRA); Physical layer procedures (Release 9)," Technical Specification, Jun. 2010, 80 pages.
CATT, "Details on R-RPDCCH search space and blind decoding in LTE-A," R1-104338, 3GPP TSG RAN WG1 Meeting #62, Agenda Item: 6.6.4, Madrid, Spain, Aug. 23-27, 2010, 3 pages.
English translation of Chinese Search Report dated Dec. 2, 2014, for corresponding Chinese Application No. 201180042257.8, 2 pages.
Extended European Search Report, dated Jan. 30, 2014, for corresponding European Patent Application No. 13190847.7-1858, 8 pages.
Extended European Search Report, dated Jun. 22, 2017, for corresponding European Search Report 11823207.3-1870 / 2615754, 7 pages.
Indian Office Action, dated Jan. 22, 2019, for corresponding Indian Application No. 279/MUMNP/2013, 6 pages.
International Search Report dated Sep. 27, 2011, for corresponding International Application No. PCT/JP2011/004699, 2 pages.
LG-Nortel, "Common R-PDCCH in Control Channel for Backhaul Link," R1-094315, 3GPP TSG RAN WG1 #58bis, Agenda Item 7.8, Miyazaki, Japan, Oct. 12-16, 2009, 3 pages.
LG Electronics Inc., "Backhaul Control Channel Design in Downlink," R1-102700, TSG-RAN WG1 Meeting #61, Agenda Item: 6.6.1.2, Montreal, Canada, May 10-14, 2010, 5 pages.
NEC Group, "Supporting frequency diversity and frequency selective R-PDCCH transmissions," R1-103062, TSG-RAN WG1#61, Agenda Item: 6.6.1.2, Montreal, Canada, May 10-14, 2010, 6 pages.
Nokia, Nokia Siemens Networks, "Discussions on Backhaul Reference Signal Design," R1-102969, Agenda Item: 6.6.1.2, 3GPP TSG-RAN WG1 Meeting #61, Montreal, Canada, May 10-14, 2010, 6 pages.
Nortel, "Discussion paper on the control channel and data channel optimization for relay link," R1-091384, Agenda Item: 15.3, 3GPP TSG-RAN Working Group 1 Meeting #56bis, Seoul, Korea, Mar. 23-27, 2009, 10 pages.
Panasonic, "DCI formats for R-PDCCH," R1-103776, 3GPP TSG RAN WG1 Meeting #61bis, Agenda Item: 6.6.1, Dresden, Germany, Jun. 28-Jul. 2, 2010, pp. 1-3.
Panasonic, "R-PDCCH placement," R1-102042, 3GPP Tsg Ran WG1 Meeting #60bis, Agenda Item: 6.6.1.2 Backhaul control channel design, Beijing, China, Apr. 12-16, 2010, 5 pages.
Panasonic, "R-PDCCH placement," R1-102881, 3GPP TSG RAN WG1 Meeting #61, Agenda Item: 6.6.1.2 Backhaul control channel design, Montreal, Canada, May 10-14, 2010, 5 pages.
Samsung, "R-PDCCH search space design," R1-103040, 3GPP TSG RAN WG1 Meeting #61, Agenda Item: 6.6.1.2, Montreal, Canada, May 10-14, 2010, 3 pages.
ZTE, "Control Signaling Structures for Relay Link," R1-090641, 3GPP TSG-RAN WG1 Meeting #56, Athens, Greece, Feb. 9-13, 2009, 3 pages.

* cited by examiner

COMMUNICATION APPARATUS AND COMMUNICATION RECEPTION METHOD

TECHNICAL FIELD

The claimed invention relates to a base station, a terminal, a transmission method, and a reception method.

BACKGROUND ART

In 3rd Generation Partnership Project Radio Access Network Long Term Evolution (3GPP-LTE (hereinafter, referred to as LTE)), Orthogonal Frequency Division Multiple Access (OFDMA) is adopted as a downlink communication scheme, and Single Carrier Frequency Division Multiple Access (SC-FDMA) is adopted as an uplink communication scheme (e.g., see NPL-1, NPL-2, and NPL-3).

In LTE, a base station apparatus for radio communications (hereinafter, abbreviated as "base station") performs communications by allocating a resource block (RB) in a system band to a terminal apparatus for radio communications (hereinafter, abbreviated as "terminal") for every time unit called "subframe." The base station also transmits downlink control information (i.e., L1/L2 control information) for the notification of the result of resource allocation for downlink data and uplink data to the terminal. The downlink control information is transmitted to the terminal through a downlink control channel such as a Physical Downlink Control Channel (PDCCH).

Here, the base station controls, on a subframe basis, the amount of resource (that is, the number of OFDM symbols used as a PDCCH region) of a resource region used for transmission of the PDCCH (hereinafter, referred to as "PDCCH region" in some cases), in accordance with the number of allocation target terminals and the like. This control is performed by notifying a control format indicator (CFI) transmitted using a Physical Control Format Indicator Channel (PCFICH), from the base station to the terminal. The CFI indicates the number of OFDM symbols used as the PDCCH region, starting from a leading OFDM symbol in a subframe. That is, the CFI represents the scale of the PDCCH region. The terminal receives the PCFICH, and receives a PDCCH according to the detected CFI value.

Each PDCCH also occupies a resource composed of one or more consecutive control channel elements (CCEs). In LTE, the number of CCEs occupied by a PDCCH (the number of concatenated CCEs: CCE aggregation level) is selected from 1, 2, 4, and 8 depending on the number of bits of downlink control information or the condition of a propagation path of a terminal. In LTE a frequency band having a system bandwidth of up to 20 MHz is supported.

Allocation control information transmitted from a base station is referred to as downlink control information (DCI). If a base station allocates a plurality of terminals to one subframe, the base station transmits a plurality of items of DCI at a time. In this case, in order to identify a terminal to which each item of DCI is transmitted, the base station transmits the DCI with CRC bits included therein, the bits being masked (or scrambled) with a terminal ID of the transmission destination terminal. Then, the terminal performs demasking (or descrambling) on the CRC bits of a plurality of items of possible DCI directed to its own terminal with its own ID, thereby blind-decoding a PDCCH to detect the DCI directed to its own terminal.

DCI also includes resource information allocated to a terminal by a base station (resource allocation information) and a modulation and channel coding scheme (MCS). Furthermore, DCI has a plurality of formats for uplink, downlink Multiple Input Multiple Output (MIMO) transmission, and downlink non-consecutive band allocation. A terminal needs to receive both downlink allocation control information (i.e., allocation control information about a downlink) which have a plurality of formats and uplink allocation control information (i.e., allocation control information about an uplink) which have one format.

For example, for the downlink allocation control information, formats of a plurality of sizes are defined depending on a method for controlling a transmission antenna of a base station and a method for allocating a resource. Among the formats, a downlink allocation control information format for band allocation in which RBs with consecutive numbers are allocated (hereinafter, referred to as "consecutive band allocation") (hereinafter, simply referred to as "downlink allocation control information") and an uplink allocation control information format for consecutive band allocation (hereinafter, simply referred to as "uplink allocation control information") have the same size. These formats (i.e., DCI formats) include type information (for example, a one-bit flag) indicating the type of allocation control information (downlink allocation control information or uplink allocation control information). Thus, even if DCI indicating downlink allocation control information and DCI indicating uplink allocation control information have the same size, a terminal can determine whether specific DCI indicates downlink allocation control information or uplink allocation control information by checking type information included in allocation control information.

The DCI format in which uplink allocation control information for consecutive band allocation is transmitted is referred to as "DCI format 0" (hereinafter, referred to as "DCI 0"), and the DCI format in which downlink allocation control information for consecutive band allocation is transmitted is referred to as "DCI format 1A" (hereinafter, referred to as "DCI 1A"). Since DCI 0 and DCI 1A are of the same size and distinguishable from each other by referring to type information as described above, hereinafter, DCI 0 and DCI 1A will be collectively referred to as DCI 0/1A.

In addition to the DCI formats described above, there are other formats for downlink, such as: a DCI format 1 (hereinafter, referred to as DCI 1) for band allocation in which RBs with non-consecutive numbers are allocated (hereinafter, referred to as "non-consecutive band allocation"); DCI formats 2 and 2A for allocating spatial multiplexing MIMO transmission (hereinafter, referred to as DCI 2, 2A); a format of downlink allocation control information for allocating beamforming transmission ("beamforming allocation downlink format": a DCI format 1B); and a format of downlink allocation control information for allocating multiuser MIMO transmission ("multiuser MIMO allocation downlink format": a DCI format 1D). DCI 1, DCI 2, DCI 2A, DCI 1B and DCI 1D are formats that are dependent on a downlink transmission mode of a terminal (for non-consecutive band allocation, spatial multiplexing MIMO transmission, beamforming transmission, multiuser MIMO transmission) and configured for each terminal. In contrast, DCI 0/1A is a format that is independent of a transmission mode and can be used for a terminal having any transmission mode, i.e., a format commonly used for every terminal. If DCI 0/1A is used, single-antenna transmission or a transmission diversity scheme is used as a default transmission mode. Meanwhile, the following formats are studied for uplink allocation: a DCI format 0A for non-consecutive band allocation; and a DCI format 0B for allocating spatial multiplexing MIMO transmission. These formats are both configured for each terminal.

Also, for the purpose of reducing the number of blind decoding operations to reduce a circuit scale of a terminal, a method for limiting CCEs targeted for blind decoding for each terminal has been under study. This method limits a CCE region that may be targeted for blind decoding by each terminal (hereinafter, referred to as "search space"). As used herein, a CCE region unit allocated to each terminal (i.e., corresponding to a unit for blind decoding) is referred to as "downlink control information allocation region candidate (i.e., DCI allocation region candidate)" or "unit region candidate targeted for decoding."

In LTE, a search space is configured for each terminal at random. The number of CCEs that forms a search space is defined based on the number of concatenated CCEs of a PDCCH. For example, the number of CCEs forming search spaces is 6, 12, 8, and 16 in association with the number of concatenated CCEs of PDCCHs 1, 2, 4, and 8, respectively. In this case, the number of unit region candidates targeted for decoding is 6 (=6/1), 6 (=12/2), 2 (=8/4), and 2 (=16/8) in association with the number of concatenated CCEs of the PDCCHs, 1, 2, 4, and 8, respectively. In other words, the total number of unit region candidates targeted for decoding is limited to 16. Thus, since each terminal may perform blind-decoding only on a group of unit region candidates targeted for decoding in a search space allocated to its own terminal, the number of blind decoding operations can be reduced. A search space in each terminal is configured using a terminal ID of each terminal and a hash function for randomization. A terminal-specific CCE region is referred to as "UE specific search space (UE-SS)".

The PDCCH also includes control information for data allocation, the information being common to a plurality of terminals and notified to the plurality of terminals at a time (for example, allocation information about downlink notification signals and allocation information about signals for paging) (hereinafter, referred to as "control information for a common channel"). To transmit the control information for a common channel, a CCE region common to all the terminals that are to receive downlink notification signals (hereinafter, referred to as "common search space: C-SS") is used for the PDCCH. A C-SS includes six unit region candidates targeted for decoding in total, namely, 4 (=16/4) and 2 (=16/8) candidates with respect to the number of concatenated CCEs, 4 and 8, respectively.

In a UE-SS, the terminal performs blind-decoding for the DCI formats of two sizes, i.e., the DCI format (DCI 0/1A) common to all the terminals and the DCI format (one of DCI 1, DCI 2 and DCI 2A) dependent on a transmission mode. For example, in a UE-SS, the terminal performs 16 blind-decoding operations in each of the DCI formats of the two sizes as described above. A transmission mode notified by the base station determines for which two sizes of the DCI formats the blind decoding is performed. In contrast, in a C-SS, the terminal performs six blind-decoding operations on each DCI format 1C, which is a format for common channel allocation (hereinafter, referred to as "DCI 1C") and DCI 1A, (i.e., 12 blind decoding operations in total) regardless of a notified transmission mode. Accordingly, the terminal performs 44 blind decoding operations in total for each subframe.

DCI 1A is used for common channel allocation and DCI 0/1A used for terminal-specific data allocation have the same size, and terminal IDs are used to distinguish between DCI 1A and DCI 0/1A. Thus, the base station can transmit DCI 0/1A used for terminal-specific data allocation also in a C-SS without an increase in the number of blind decoding operations to be performed by the terminals.

Also, the standardization of 3GPP LTE-Advanced (hereinafter, referred to as LTE-A), which provides a data transfer rate higher than that of LTE, has been started. In LTE-A, in order to achieve a downlink transfer rate up to 1 Gbps and an uplink transfer rate up to 500 Mbps, a base station and a terminal capable of communicating at a wideband frequency of 40 MHz or higher (hereinafter, referred to as LTE-A terminal) will be introduced. An LTE-A system is also required to support a terminal designed for an LTE system (hereinafter, referred to as LTE terminal) in the system in addition to an LTE-A terminal.

Additionally, in LTE-A, to achieve an increased coverage, the introduction of radio communication relay apparatus (hereinafter, referred to as "relay station" or "Relay Node" (RN)) has been specified (see FIG. 1). Accordingly, the standardization of downlink control channels from base stations to relay stations (hereinafter, referred to as "R-PDCCH") is under way (e.g., see NPL-4, NPL-5, NPL-6, and NPL-7). At present, the following matters are being studied in relation to the R-PDCCH. FIG. 2 illustrates an example of an R-PDCCH region.

(1) A mapping start position in the direction of time-axis of an R-PDCCH is fixed to a fourth OFDM symbol from a leading symbol of one subframe, and thus does not depend on the rate at which a PDCCH occupies OFDM symbols in the time-axis.

(2) Each R-PDCCH occupies a resource formed by one or more consecutive relay-control channel elements (R-CCEs). The number of REs that form one R-CCE is different on a slot basis or on a reference signal arrangement basis. Specifically, at Slot 0, the R-CCE is defined as a resource region (excluding regions to which reference signals are mapped) having a range from the third OFDM symbol to the end of Slot 0 in the time direction and having a range of a one-RB width in the frequency direction. Further, at Slot 1, the R-CCE is defined as a resource region (excluding regions to which reference signals are mapped) having a range from the beginning of Slot 1 to the end of Slot 1 in the time direction and having a range of a one-RB width in the frequency direction. Note that, for Slot 1, it is also proposed to divide the above-mentioned resource region into two and define each divided region as one R-CCE.

CITATION LIST

Non-Patent Literature

NPL 1
3GPP TS 36.211 V8.7.0, "Physical Channels and Modulation (Release 8)," September 2008
NPL 2
3GPP TS 36.212 V8.7.0, "Multiplexing and channel coding (Release 8)," September 2008
NPL 3
3GPP TS 36.213 V8.7.0, "Physical layer procedures (Release 8)," September 2008
NPL 4
3GPP TSG RAN WG1 meeting, R1-102700, "Backhaul Control Channel Design in Downlink," May 2010
NPL 5
3GPP TSG RAN WG1 meeting, R1-102881, "R-PDCCH placement," May 2010

NPL 6

3GPP TSG RAN WG1 meeting, R1-103040, "R-PDCCH search space design," May 2010

NPL 7

3GPP TSG RAN WG1 meeting, R1-103062, "Supporting frequency diversity and frequency selective R-PDCCH transmissions," May 2010

SUMMARY OF INVENTION

Technical Problem

Considering that various apparatuses for machine-to-machine (M2M) communication and the like will be introduced hereafter as wireless communication terminals, insufficient resources of a region to which the PDCCH is mapped (that is, a PDCCH region), which are caused by an increase in the number of terminals, are concerned. If the insufficient resources make it impossible to map the PDCCH, downlink data allocation to the terminal cannot be performed. Consequently, even if a resource region to which downlink data is mapped (hereinafter, referred to as "PDSCH region") is available, the available region cannot be used, and the system throughput may become lower. It is thought that the DCI for the terminal under the control of the base station is included in the region (hereinafter, referred to as "R-PDCCH region") to which the R-PDCCH is mapped (see FIG. 3), as a method of overcoming insufficient resources.

Further, a heterogeneous network including a macro base station and a femto/pico base station as illustrated in FIG. 4 has a concern that interference in the PDCCH region of each cell is increased by an influence from other cells. For example, in the case where a terminal connected to the macrocell is located near the femto cell (particularly in the case where the terminal is not permitted to connect to the femto base station), the terminal is significantly interfered by the femto cell. In the case where a terminal connected to the pico cell is located near a cell edge (for example, a range expansion region) of the pico cell, the terminal is significantly interfered by the macrocell. Consequently, the control information receiving performance of each terminal unfavorably becomes lower in the PDCCH region.

To solve this, if the R-PDCCH is used for transmission of the DCI directed to a terminal connected to the base station, the DCI receiving performance can be suppressed from becoming lower. That is, in order to enable the terminal under the control of the femto/pico base station to receive the DCI at a sufficiently low error rate, the macro base station transmits the DCI while reducing its transmission power in a given RB, whereas the femto/pico base station transmits the DCI to the terminal under the control thereof using the given RB. As a result, a terminal connected to the femto/pico base station can receive the DCI using the RB with small interference from the macro base station, and thus can receive the DCI with a low error rate. Similarly, the macro base station transmits the DCI using a RB with small interference from the femto/pico base station, whereby a terminal connected to the macro base station can receive the DCI with a low error rate.

However, simple addition of an R-PDCCH region to a PDCCH region as a region for transmitting DCI to a terminal connected to a base station may disadvantageously lead to an increase in the number of blind decoding operations to be performed by the terminal, resulting in increases in power consumption, processing delay, and circuit scale.

To solve this problem, it is desirable to suppress the total number of blind decoding operations on both the PDCCH and the R-PDCCH to be equal to or less than a predetermined value. For example, the number of blind decoding operations on each of two DCI formats (for example, the DCI format 0/1A and the DCI format 2) as blind decoding targets is set to 8 for the PDCCH and 8 for the R-PDCCH (32 in total), whereby the number of blind decoding operations can be suppressed to that similar to LTE.

Unfortunately, as the number of terminals is larger, the probability that a false alarm (erroneous detection of control information) occurs in the system is higher. The false alarm (the erroneous detection of the control information) refers to that DCI directed to another terminal or a non-transmitted signal (that is, noise components) is erroneously detected as DCI directed to its own terminal. Hereinafter, a simplified expression of "erroneous detection" refers to such a false alarm (the erroneous detection of the control information). The occurrence of such erroneous detection exerts the following harmful influences on the system. For example, in the case of erroneous detection of uplink allocation control information, uplink data is transmitted, and hence interference with other terminals unfavorably increases. Further, in the case of erroneous detection of downlink allocation control information, ACK/NACK is transmitted through the uplink, and hence an error may occur in ACK/NACK of other terminals. These harmful influences lead to a decrease in system throughput in the uplink and the downlink, and hence the false alarm needs to be reduced.

The claimed invention has an object to provide a base station, a terminal, a transmission method, and a reception method that can reduce erroneous detection of control information, to thereby prevent a decrease in system throughput.

Solution to Problem

A base station reflecting one aspect of the claimed invention includes: a mapping section that configures any of a first resource region usable for both a control channel and a data channel and a second resource region usable for the control channel, on a basis of an amount of resource used in the second resource region, and maps control information to the configured first resource region or the configured second resource region; and a transmitting section that transmits the mapped control information.

A terminal reflecting one aspect of the claimed invention includes: a receiving section that receives control information in a first resource region usable for both a control channel and a data channel or a second resource region usable for the control channel, and receives information indicating an amount of resource used in the second resource region; and an identifying section that identifies any of the first resource region and the second resource region as a decoding target region of the control information, on a basis of the amount of resource.

A transmission method reflecting one aspect of the claimed invention includes: configuring any of a first resource region usable for both a control channel and a data channel and a second resource region usable for the control channel, on a basis of an amount of resource used in the second resource region; and mapping control information to the configured first resource region or the configured second resource region.

A reception method reflecting one aspect of the claimed invention includes: receiving control information in a first resource region usable for both a control channel and a data channel or a second resource region usable for the control channel; receiving information indicating an amount of resource used in the second resource region; and identifying any of the first resource region and the second resource region as a decoding target region of the control information, on a basis of the amount of resource.

Advantageous Effects of Invention

According to the claimed invention, it is possible to provide a base station, a terminal, a transmission method, and a reception method that can reduce erroneous detection of control information, to thereby prevent a decrease in system throughput.

DESCRIPTION OF EMBODIMENTS

Figure 1:
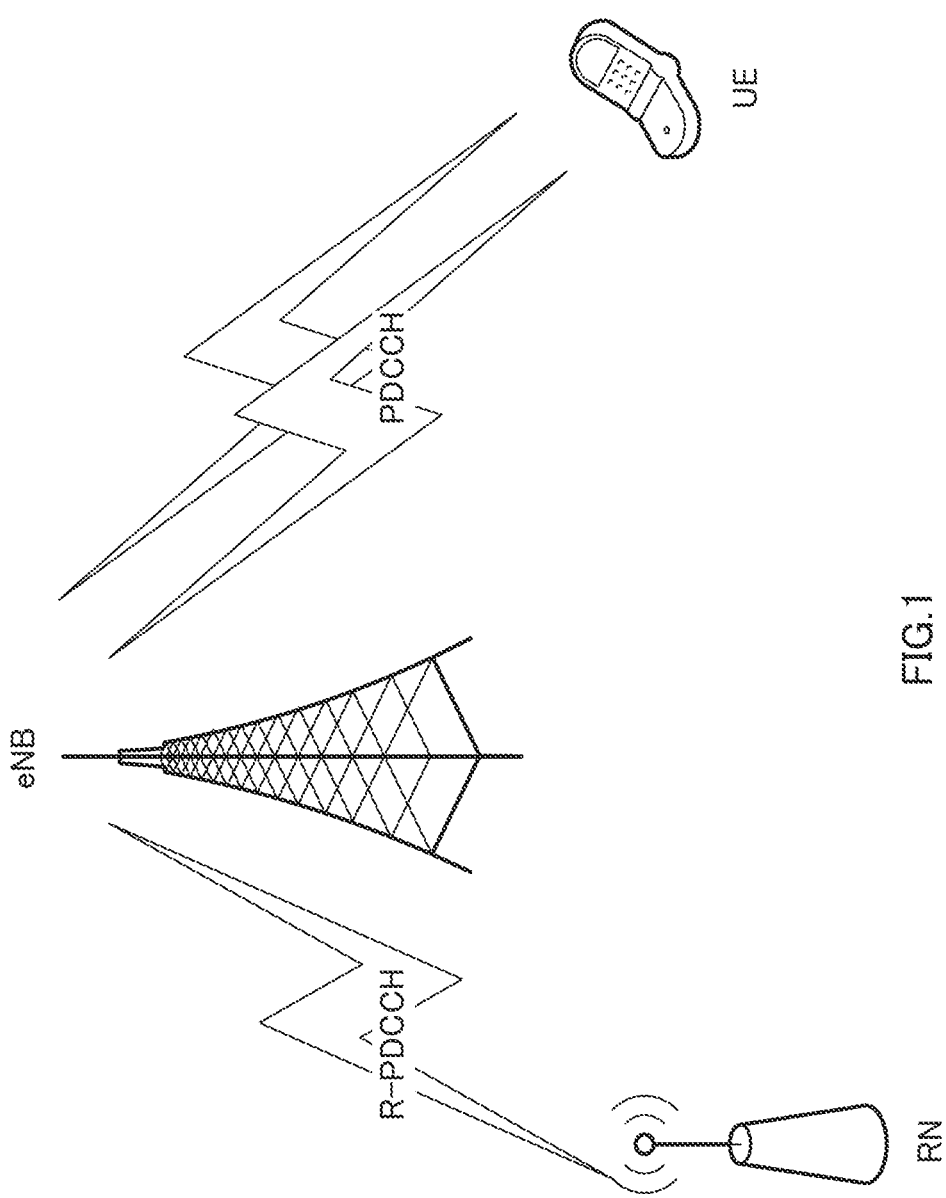
FIG. 1 is a diagram for explaining a relay station.
Figure 2:
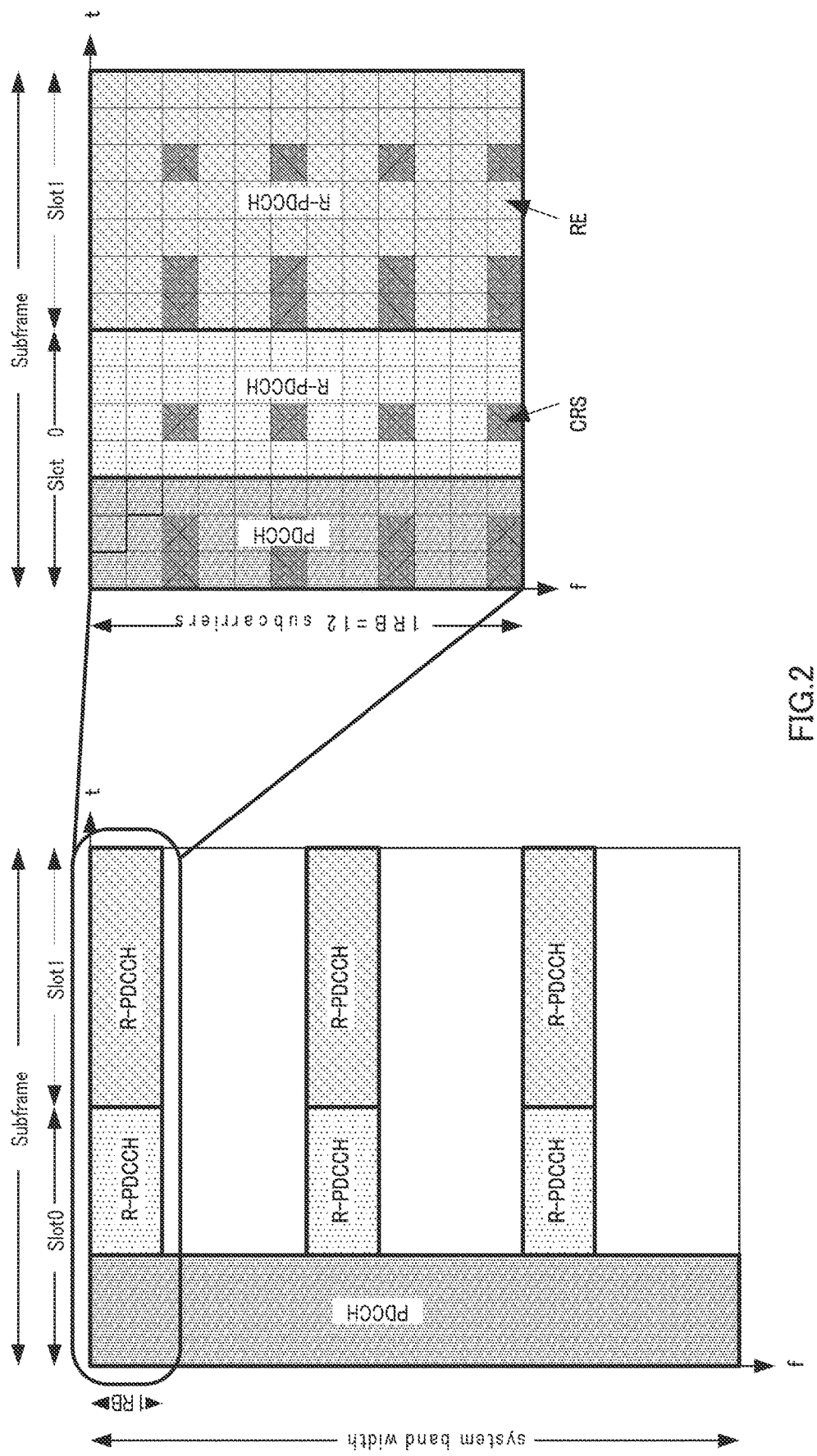
FIG. 2 illustrates an example of R-PDCCH regions.
Figure 3:
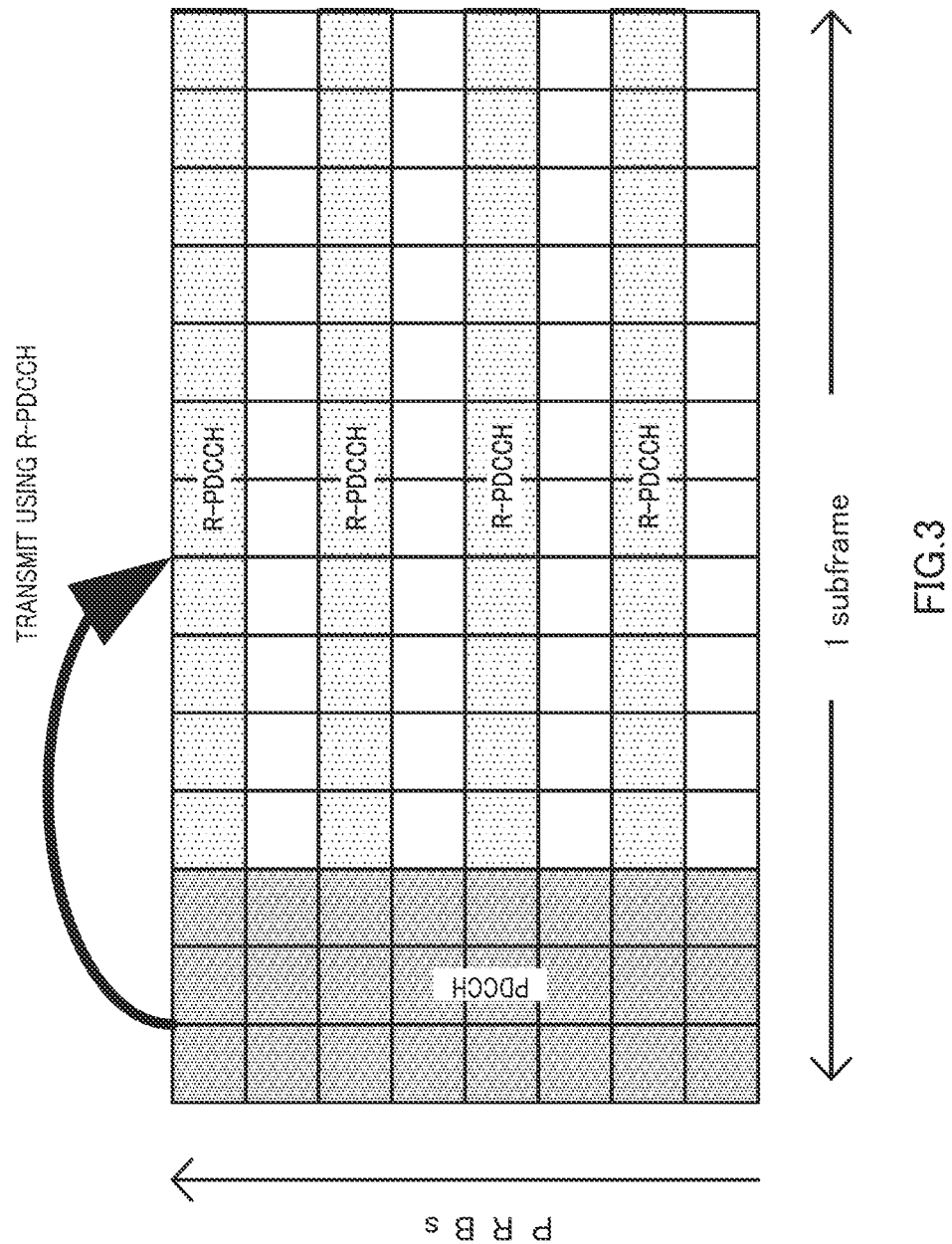
FIG. 3 is a diagram for explaining R-PDCCH.

Embodiments of the claimed invention will be described in detail with reference to the accompanying drawings. In the embodiments, the same reference numerals are used for denoting the same components, and a redundant description thereof is omitted.

Embodiment 1

Communication System Overview

A communication system according to Embodiment 1 of the claimed invention includes base station 100 and terminal 200. Base station 100 is, for example, an LTE-A base station, and terminal 200 is, for example, an LTE-A terminal. Base station 100 maps a downlink allocation control information unit (that is, DCI) to a first resource region (that is, an R-PDCCH region) usable as both a downlink control channel region and a downlink data channel region or to a second resource region (that is, a PDCCH region) that is not used as the downlink data channel region and is usable as the downlink control channel, and base station 100 transmits the mapped DCI.

Figure 5:
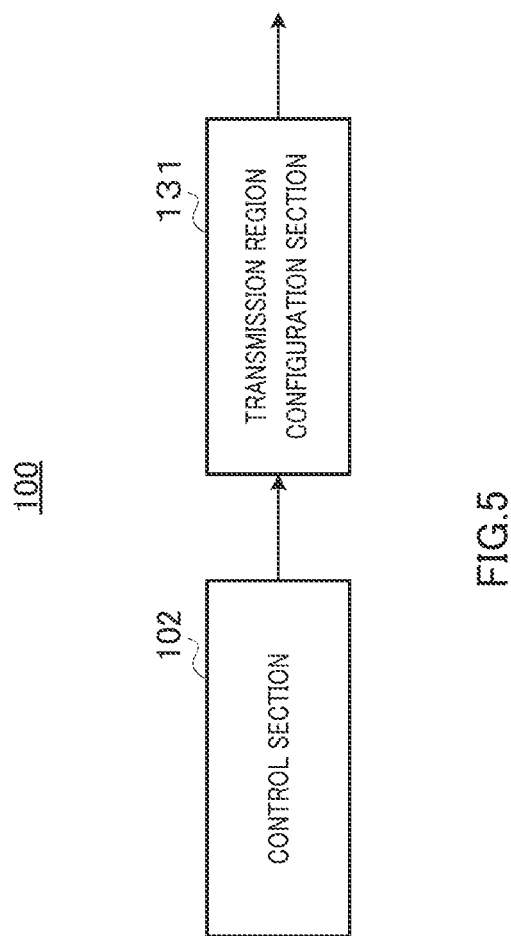
FIG. 5 is a principal block diagram of a base station according to Embodiment 1 of the claimed invention.

FIG. 5 is a principal block diagram of base station 100 according to Embodiment 1 of the claimed invention. In base station 100, control section 102 sets the scale of the PDCCH region, and transmission region configuration section 131 configures a mapping region to which the DCI is to be mapped, in the R-PDCCH region and the PDCCH region on the basis of the scale value (that is, the CFI value) set by control section 102. That is, transmission region configuration section 131 configures the mapping region to which the DCI is to be mapped, on the basis of the amount of resource used in the PDCCH region.

Figure 6:
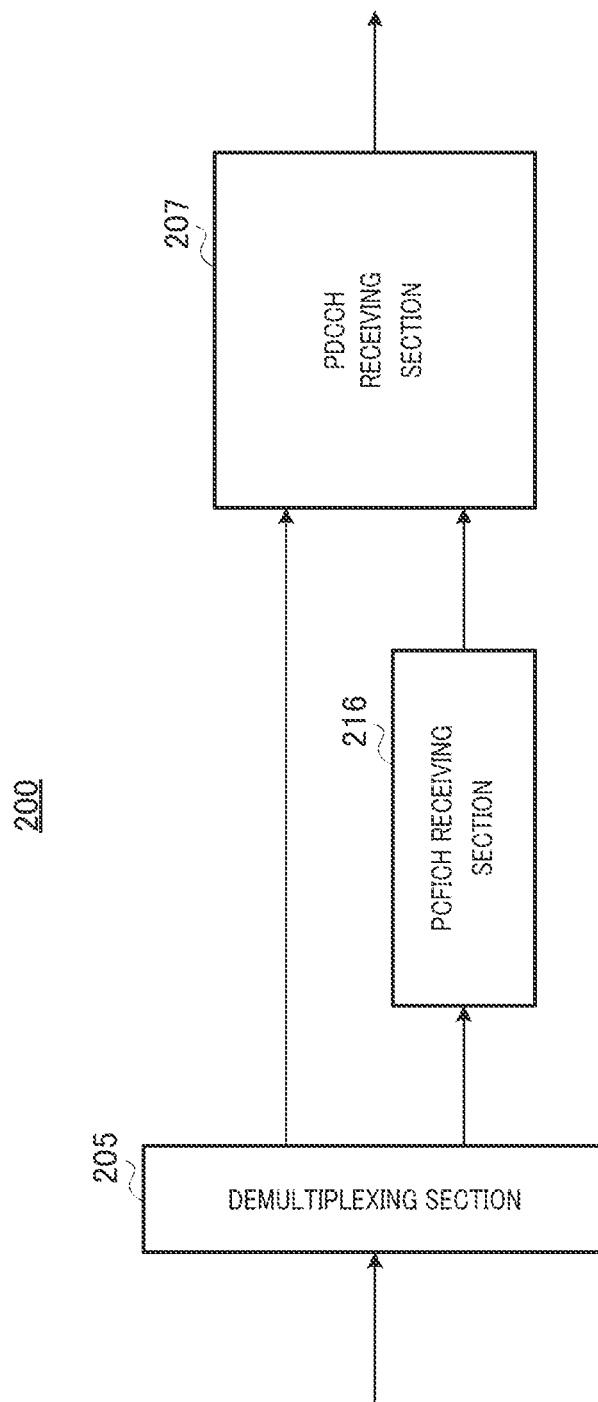
FIG. 6 is a principal block diagram of a terminal according to Embodiment 1 of the claimed invention.

FIG. 6 is a principal block diagram of terminal 200 according to Embodiment 1 of the claimed invention. In terminal 200, in the first resource region (that is, the R-PDCCH region) usable as both the downlink control channel region and the downlink data channel region or in the second resource region (that is, the PDCCH region) that is not used as the downlink data channel region and is usable as the downlink control channel, demultiplexing section 205 and PCFICH receiving section 216 receive a downlink allocation control information unit (that is, DCI) including cyclic redundancy check (CRC) bits masked or scrambled by discrimination information of a destination terminal, and also receive scale information indicating the scale set in the PDCCH region. PDCCH receiving section 207 identifies a detection target resource region in the R-PDCCH region and the PDCCH region on the basis of the scale information. In the identified detection target resource region, PDCCH receiving section 207 detects a downlink allocation control information unit directed to its own terminal with reference to the discrimination information of its own terminal as a detection criterion. That is, PDCCH receiving section 207 identifies a decoding target region on the basis of the amount of resource used in the PDCCH region.

(Configuration of Base Station 100)

Figure 7:
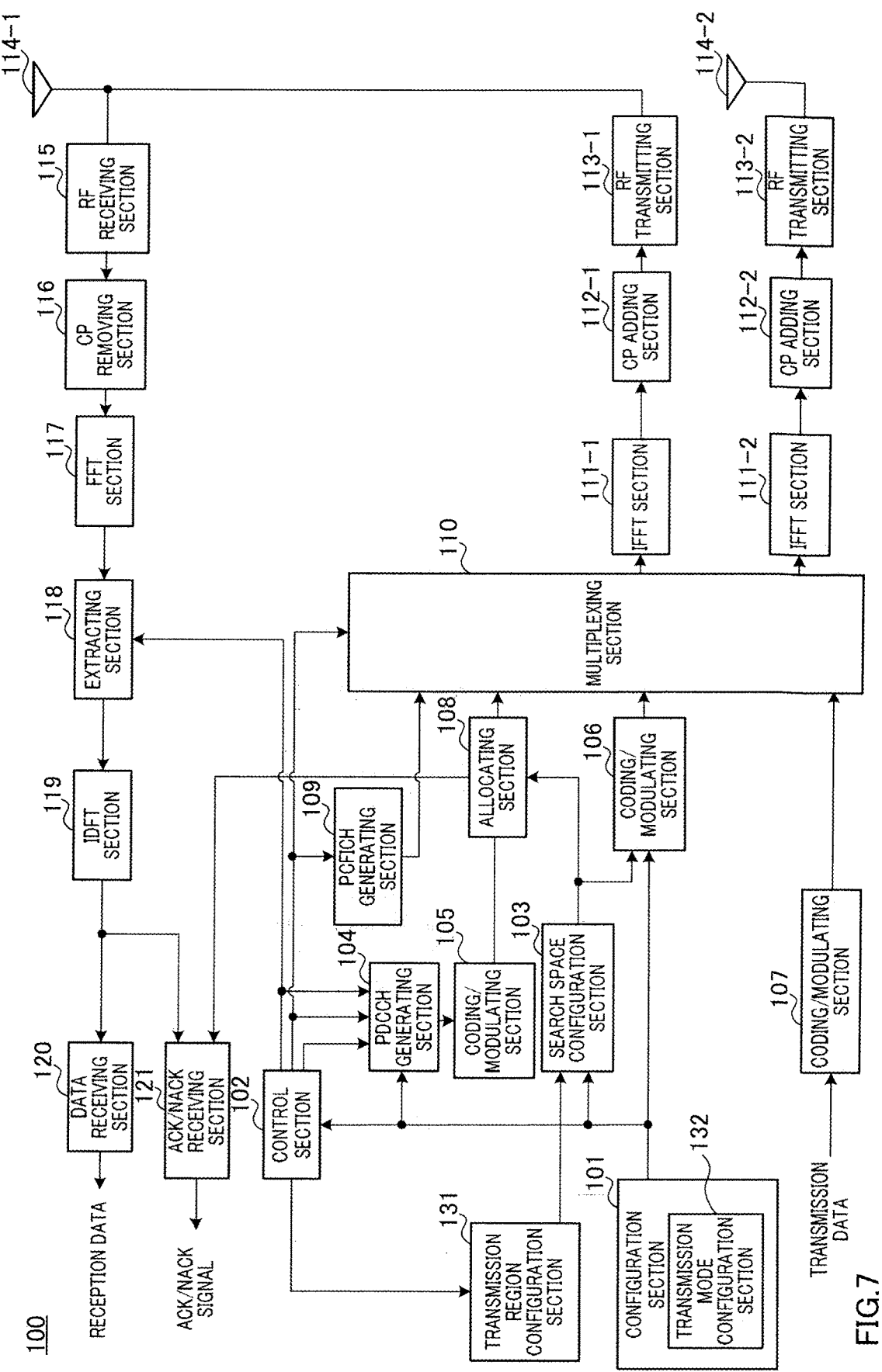
FIG. 7 is a block diagram illustrating the configuration of the base station according to Embodiment 1 of the claimed invention.

FIG. 7 is a block diagram illustrating the configuration of base station 100 according to Embodiment 1 of the claimed invention. In FIG. 7, base station 100 includes configuration section 101, control section 102, search space configuration section 103, PDCCH generating section 104, coding/modulating sections 105, 106 and 107, allocating section 108, PCFICH generating section 109, multiplexing section 110, inverse fast Fourier transform (IFFT) section 111, cyclic prefix (CP) adding section 112, RF transmitting section 113, antenna 114, RF receiving section 115, CP removing section 116, fast Fourier transform (FFT) section 117, extracting section 118, inverse discrete Fourier transform (IDFT) section 119, data receiving section 120, ACK/NACK receiving section 121, and transmission region configuration section 131.

Configuration section 101 configures each transmission mode for uplink and downlink for terminal 200. The configuration of a transmission mode is performed for each terminal 200 to be configured. Configuration information about a transmission mode is sent to control section 102, search space configuration section 103, PDCCH generating section 104, and coding/modulating section 106.

Specifically, configuration section 101 includes transmission mode configuration section 132.

Transmission mode configuration section 132 configures a transmission mode (for example, spatial multiplexing MIMO transmission, beamforming transmission, and non-consecutive band allocation) to each of the uplink and the downlink of each terminal 200 on the basis of propagation path conditions and the like of each terminal 200.

Then, configuration section 101 outputs configuration information containing information indicating the transmission mode configured for each terminal 200, to control section 102, search space configuration section 103, PDCCH generating section 104, and coding/modulating section 106. Note that each terminal 200 is notified of the configuration information concerning the transmission mode through coding/modulating section 106, as control information (called RRC control information or RRC signaling) of an upper layer.

Transmission region configuration section 131 configures a resource region for use in the transmission of DCI to terminal 200. Candidates of the resource regions to be configured include a PDCCH region and an R-PDCCH region. That is, transmission region configuration section 131 configures, to terminal 200, whether or not the R-PDCCH region should be added to the region (transmission region) used for transmission of the DCI, in addition to the PDCCH region.

Specifically, transmission region configuration section 131 configures a resource region to be used for transmission of the DCI directed to terminal 200, on the basis of the value indicated by the PDCCH region scale information (that is, the PDCCH region scale value) received from control section 102. In other words, transmission region configuration section 131 determines whether blind decoding is performed, for terminal 200, on only the PDCCH region or on both the PDCCH region and the R-PDCCH region (or only on the R-PDCCH region). Specifically, in the case where the PDCCH region scale value is less than a predetermined threshold value, transmission region configuration section 131 determines that the current status is normal, and configures the PDCCH region to terminal 200. On the other hand, in the case where the PDCCH region scale value is equal to or more than the predetermined threshold value, transmission region configuration section 131 determines that the PDCCH region may become tight because a large number of terminals 200 communicate under the control of base station 100, and configures both the PDCCH region and the R-PDCCH region (or only the R-PDCCH region) to terminal 200. Here, the predetermined threshold value is the maximum value of the PDCCH region scale value, and corresponds to three OFDM symbols in the case of LTE. Note that transmission region configuration section 131 configures a RB group to be used as the R-PDCCH region used for transmission of the DCI, from among all RB groups. For terminal 200, this RB group to be used corresponds to a blind decoding target RB region when the DCI is transmitted using the R-PDCCH region.

Control section 102 generates allocation control information in accordance with the configuration information received from configuration section 101.

Specifically, control section 102 generates allocation control information including HARQ related information such as MCS information, resource (i.e., RB) allocation information, and a new data indicator (NDI). The resource allocation information includes uplink resource allocation information indicating an uplink resource (for example, a Physical Uplink Shared Channel (PUSCH)) to which uplink data from terminal 200 is allocated, or downlink resource allocation information indicating a downlink resource (for example, a Physical Downlink Shared Channel (PDSCH)) to which downlink data to terminal 200 is allocated.

Furthermore, on the basis of configuration information received from configuration section 101, control section 102 generates, for each terminal 200, allocation control information based on a transmission mode of the uplink for terminal 200 (i.e., any one of DCI 0A and DCI 0B), allocation control information (any one of DCI 1, DCI 1B, DCI 1D, DCI 2, and DCI 2A) based on a transmission mode of the downlink, or allocation control information (DCI 0/1A) common to all the terminals.

For example, in order to improve throughput during normal data transmission, control section 102 generates allocation control information (any one of DCI 1, DCI 1B, DCI 1D, DCI 2, DCI 2A, DCI 0A, and DCI 0B) depending on the transmission mode of each terminal 200 so as to allow data transmission at a transmission mode configured for each terminal 200. As a result, data can be transmitted at the transmission mode configured for each terminal 200, which improves throughput.

However, an abrupt change in the condition of a propagation path or a change in interference from an adjacent cell may cause frequent errors in receiving data at the transmission mode configured for each terminal 200. In this case, control section 102 generates allocation control information in the format (DCI 0/1A) common to all the terminals and transmits data at a robust default transmission mode. As a result, robust data transmission is allowed even if a propagation environment is abruptly changed.

Also, when upper-layer control information (i.e., RRC signaling) is transmitted for the notification of a transmission mode change under deteriorated conditions of a propagation path, control section 102 generates allocation control information (i.e., DCI 0/1A) common to all the terminals and transmits the information using the default transmission mode. The number of information bits of DCI 0/1A common to all the terminals is smaller than that of DCI 1, DCI 2, DCI 2A, DCI 0A, and DCI 0B depending on a particular transmission mode. For this reason, if the same number of CCEs is set, DCI 0/1A can allow transmission at a lower coding rate than that related to DCI 1, DCI 2, DCI 2A, DCI 0A, and DCI 0B. Thus, use of DCI 0/1A in control section 102 under a deteriorated condition of a propagation path enables a terminal having a poor condition of a propagation path to receive allocation control information (and data) with a low error rate.

Control section 102 also generates allocation control information for a common channel (for example, DCI 1C and 1A) for the allocation of data common to a plurality of terminals, such as broadcasting and paging information, in addition to the allocation control information for the allocation of terminal-specific data.

Control section 102 outputs MCS information and an NDI to PDCCH generating section 104, uplink resource allocation information to PDCCH generating section 104 and extracting section 118, and downlink resource allocation information to PDCCH generating section 104 and multiplexing section 110, among the generated items of allocation control information for the allocation of terminal-specific data. Control section 102 also outputs the generated allocation control information for a common channel to PDCCH generating section 104.

Further, control section 102 decides the size of the PDCCH region (that is, the PDCCH region scale value) in accordance with the number of allocation target terminals (including both LTE terminals and LTE-A terminals). The number of OFDM symbols n=1 to 3 is prepared as the PDCCH region scale value. Further, the PDCCH region scale value is decided on the basis of the number of pieces of DCI to be transmitted within the same subframe and the amount of required resource. Control section 102 outputs the decided PDCCH region scale value to transmission region configuration section 131, PDCCH generating section 104, and PCFICH generating section 109.

PCFICH generating section 109 generates a PCFICH signal on the basis of the PDCCH region scale value received from control section 102. PCFICH generating section 109 transmits the PCFICH signal through multiplexing section 110, IFFT section 111, CP adding section 112, and RF transmitting section 113.

Search space configuration section 103 configures a common search space (C-SS) and a unique search space (UE-SS) on the basis of the DCI transmission region input from transmission region configuration section 131 and the used reference signal. The common search space (C-SS) is a search space common to all the terminals, and the unique search space (UE-SS) is a search space specific to each terminal as described above.

Specifically, search space configuration section 103 configures prepared CCEs (for example, CCEs from leading to 16th ones) as a C-SS. A CCE is a basic unit.

Search space configuration section 103 also configures a UE-SS for each terminal. For example, search space configuration section 103 determines a UE-SS for a certain terminal on the basis of the ID of the terminal, a CCE number obtained by calculations using a hash function for randomization, and the number of CCEs (L) that form a search space.

Figure 8:
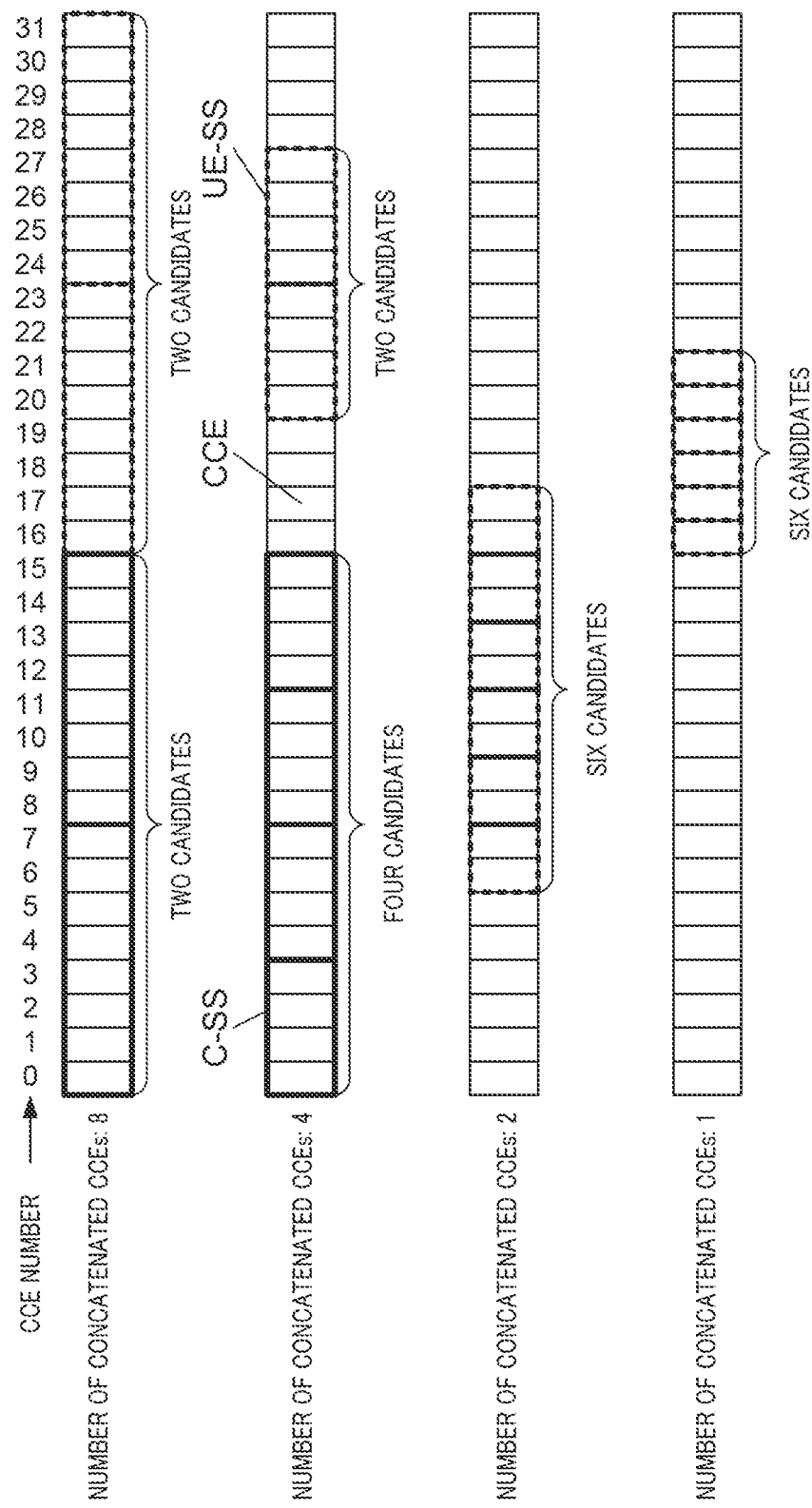
FIG. 8 is a diagram illustrating a configuration example of a C-SS and a UE-SS for a given terminal.

FIG. 8 is a diagram illustrating a configuration example of a C-SS and a UE-SS for a given terminal.

In FIG. 8, with respect to four concatenated CCEs of a PDCCH, four DCI allocation region candidates (i.e., CCEs 0 to 3, CCEs 4 to 7, CCEs 8 to 11, and CCEs 12 to 15) are configured as a C-SS. Also, with respect to eight concatenated CCEs of the PDCCH, two DCI allocation region candidates (i.e., CCEs 0 to 7 and CCEs 8 to 15) are configured as another C-SS. In other words, in FIG. 8, the six DCI allocation region candidates in total are configured as the C-SSes.

Furthermore, in FIG. 8, with respect to one concatenated CCE, six DCI allocation region candidates (i.e., each of CCEs 16 to 21) are configured as a UE-SS. With respect to two concatenated CCEs, six DCI allocation region candidates (i.e., obtained by partitioning CCE 6 to 17 into six parts) are configured as another UE-SS. With respect to four concatenated CCEs, two DCI allocation region candidates (i.e., CCEs 20 to 23 and CCEs 24 to 27) are configured as yet another UE-SS. With respect to eight concatenated CCEs, two DCI allocation region candidates (i.e., CCEs 16 to 23 and CCEs 24 to 31) are configured as still another UE-SS. In other words, in FIG. 8, 16 DCI allocation region candidates in total are configured as the UE-SSes.

Further, in the case where both the PDCCH region and the R-PDCCH region are configured as the DCI transmission regions, search space configuration section 103 configures search spaces (C-SS and UE-SS) including the plurality of DCI allocation region candidates, to the PDCCH region and the R-PDCCH region. Here, only in the case where the PDCCH region scale value is equal to or more than a predetermined threshold value, search space configuration section 103 configures the search space to the R-PDCCH region.

Then, search space configuration section 103 outputs search space information indicating the configured C-SS and the configured UE-SS of each terminal, to allocating section 108 and coding/modulating section 106.

Returned to FIG. 7, PDCCH generating section 104 generates DCI including allocation control information received from control section 102 for the allocation of terminal-specific data (i.e., MCS information, HARQ information, and uplink resource allocation information or downlink resource allocation information for each terminal) or DCI including allocation control information for a common channel (i.e., broadcasting information, paging information, and other information common to terminals). Further, PDCCH generating section 104 adds CRC bits to the uplink allocation control information and the downlink allocation control information generated for each terminal and masks (or scrambles) the CRC bits with a terminal ID. PDCCH generating section 104 then outputs the masked PDCCH signals to coding/modulating section 105.

Coding/modulating section 105 modulates the DCI received from PDCCH generating section 104 after channel coding and outputs the modulated signals to allocating section 108. Coding/modulating section 105 determines a coding rate set on the basis of channel quality indicator (CQI) information reported from each terminal so as to achieve a sufficient reception quality in each terminal. For example, as a distance between a terminal and a cell boundary decreases (i.e., as the channel quality of a terminal deteriorates), the coding rate to be set by coding/modulating section 105 decreases.

DCI including allocation control information for a common channel and DCI including allocation control information for the allocation of terminal-specific data to each terminal are input from coding/modulating section 105 to allocating section 108. Then, allocating section 108 allocates the received DCI to each of CCEs or R-CCEs in a C-SS and CCEs or R-CCEs in a UE-SS for each terminal in accordance with search space information input from search space configuration section 103.

For example, allocating section 108 selects one DCI allocation region candidate from a group of DCI allocation region candidates in a C-SS (for example, see FIG. 8). Allocating section 108 then allocates DCI including allocation control information for a common channel to a CCE (or an R-CCE; hereinafter, sometimes simply referred to as "CCE" without distinguishing "CCE" from "R-CCE") in the selected DCI allocation region candidate. Here, as described above, the CCE refers to a resource unit that forms the PDCCH, and the R-CCE refers to a resource unit that forms the R-PDCCH.

In the case where a DCI format specific to an allocation target terminal is a DCI format dependent on the transmission mode (for example, DCI 1, DCI 1B, DCI 1D, DCI 2, DCI 2A, DCI 0A, or DCI 0B), allocating section 108 allocates a CCE in a UE-SS configured for the allocation target terminal to DCI. On the other hand, in the case where a DCI format specific to an allocation target terminal is a format common to all the terminals (for example, DCI 0/1A), allocating section 108 allocates a CCE in a C-SS or a CCE in a UE-SS configured for the allocation target terminal to DCI.

The number of concatenated CCEs to be allocated to one DCI item depends on the coding rate and the number of DCI bits (namely, the amount of allocation control information). For example, more physical resources are required for a coding rate set to be low of PDCCH signals directed to a terminal located around a cell boundary. For this reason, allocating section 108 allocates more CCEs to DCI directed to a terminal located around a cell boundary.

Allocating section 108 then outputs information about the CCEs allocated to the DCI to multiplexing section 110 and ACK/NACK receiving section 121. Allocating section 108 outputs the coded/modulated DCI to multiplexing section 110.

After channel coding, coding/modulating section 106 modulates the configuration information input from configuration section 101 and the search space information (that is, the control information of the upper layer) input from search space configuration section 103, and outputs the modulated configuration information and search space information to multiplexing section 110.

Coding/modulating section 107 modulates the input transmission data (downlink data) after channel coding and outputs the modulated transmission data signals to multiplexing section 110.

Multiplexing section 110 multiplexes the coded/modulated DCI signals received from allocating section 108, the modulated configuration information and search space information (i.e., upper-layer control information) received from coding/modulating section 106, and the data signals (namely, PDSCH signals) received from coding/modulating section 107, on the time-axis and the frequency-axis.

Here, multiplexing section 110 multiplies, by a weight, the DCI, the PDSCH signal, or the like in the R-PDCCH region directed to a terminal using a DM-RS as a reference signal for demodulation, and outputs the result to inverse fast Fourier transform (IFFT) section 111 for each antenna. Further, multiplexing section 110 performs a spatial frequency block coding (SFBC) process on a signal to which a transmission weight is not set (that is, the DCI and the like in the PDCCH region), and outputs the result to IFFT section 111 for each antenna. Multiplexing section 110 maps the PDCCH signals and the data signals (PDSCH signals) on the basis of the downlink resource allocation information received from control section 102. Multiplexing section 110 may also map the configuration information and search space information onto the PDSCH. In addition, multiplexing section 110 maps PCFICH signals to a leading OFDM symbol in a subframe.

IFFT section 111 converts the multiplexed signals received from multiplexing section 110 for each antenna into a time waveform. CP adding section 112 adds a CP to the time waveform to obtain OFDM signals.

RF transmitting section 113 performs radio processing for transmission (for example, up-conversion or digital-analog (D/A) conversion) on the OFDM signals received from CP adding section 112 and transmits the resultant signals via antenna 114.

RF receiving section 115 also performs radio processing for reception (for example, down-conversion or analog-digital (A/D) conversion) on radio signals received via antenna 114 at a receiving band and outputs the resultant received signals to CP removing section 116.

CP removing section 116 removes the CP from the received signals and fast Fourier transform (FFT) section 117 converts the received signals from which the CP is removed into frequency domain signals.

Extracting section 118 extracts uplink data from the frequency domain signals received from FFT section 117 on the basis of uplink resource allocation information received from control section 102. IDFT section 119 converts the extracted signals into time domain signals and outputs the time domain signals to data receiving section 120 and ACK/NACK receiving section 121.

Data receiving section 120 decodes the time domain signals input from IDFT section 119. Data receiving section 120 then outputs decoded uplink data as received data.

ACK/NACK receiving section 121 extracts, from the time domain signals received from IDFT section 119, ACK/NACK signals from each terminal for the downlink data (PDSCH signals). Specifically, ACK/NACK receiving section 121 extracts the ACK/NACK signals from an uplink control channel (e.g., a Physical Uplink Control Channel (PUCCH) on the basis of the information received from allocating section 108. The uplink control channel is associated with the CCEs used for the transmission of the downlink allocation control information corresponding to the downlink data.

ACK/NACK receiving section 121 then determines the ACK or NACK of the extracted ACK/NACK signals.

One reason that the CCEs and the PUCCH are associated with each other is to obviate the need for signaling sent by the base station to notify each terminal of a PUCCH for use in transmitting ACK/NACK signals from the terminal, which thereby allows downlink communication resources to be efficiently used. Consequently, in accordance with the association between the CCEs and the PUCCH, each terminal determines a PUCCH for use in transmitting ACK/NACK signals on the basis of the CCEs to which downlink allocation control information (DCI) for its own terminal is mapped.

[Configuration of Terminal 200]

Figure 9:
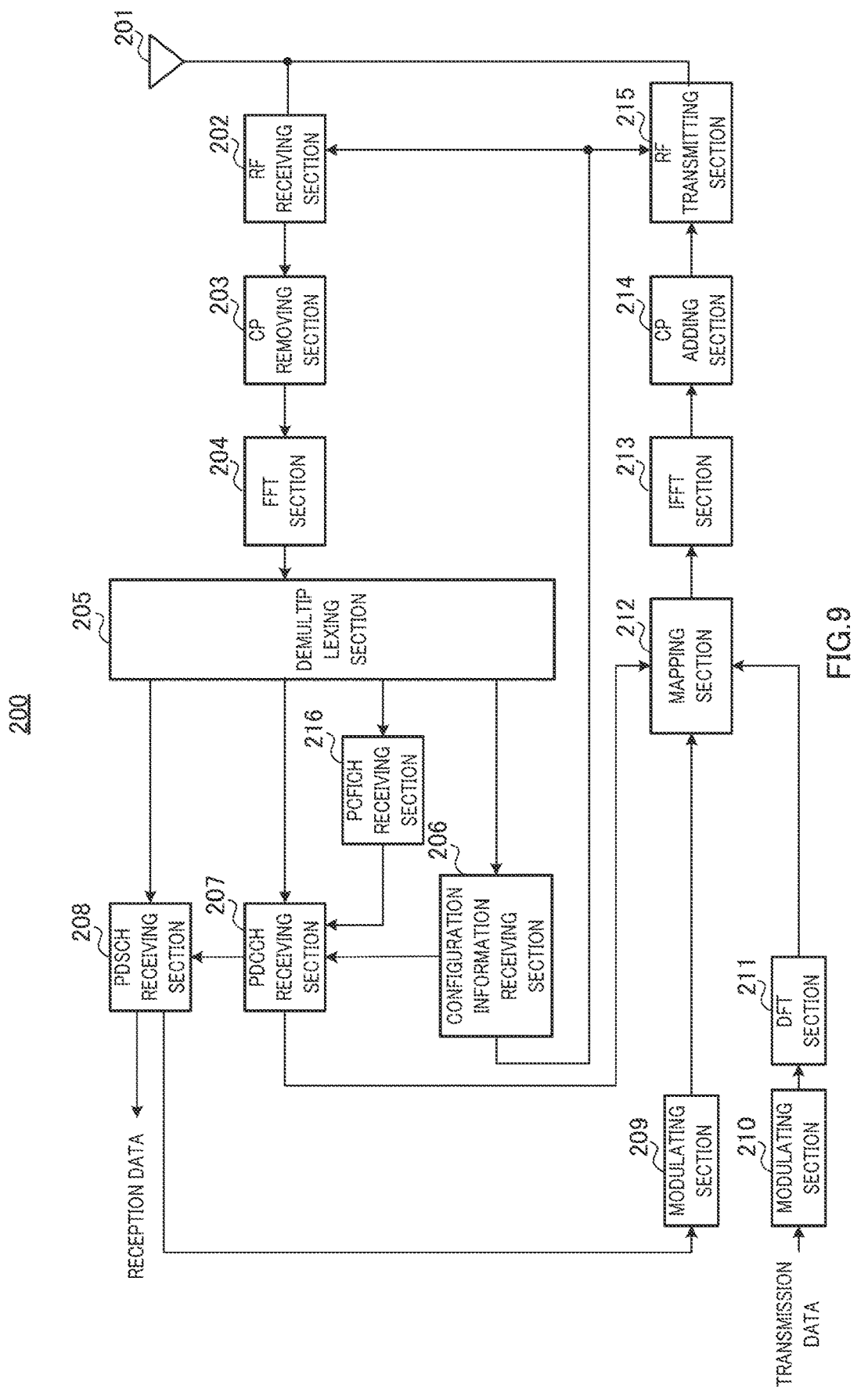
FIG. 9 is a block diagram illustrating the configuration of the terminal according to Embodiment 1 of the claimed invention.

FIG. 9 is a block diagram illustrating the configuration of terminal 200 according to Embodiment 1 of the claimed invention. Terminal 200 receives downlink data and transmits ACK/NACK signals for the downlink data to base station 100 via a PUCCH which is an uplink control channel.

In FIG. 9, terminal 200 includes antenna 201, RF receiving section 202, CP removing section 203, FFT section 204, demultiplexing section 205, configuration information receiving section 206, PDCCH receiving section 207, PDSCH receiving section 208, modulating sections 209 and 210, DFT section 211, mapping section 212, IFFT section 213, CP adding section 214, RF transmitting section 215 and PCFICH receiving section 216.

RF reception section 202 sets a reception band on the basis of band information received from configuration information receiving section 206. RF reception section 202 performs radio processing for reception (e.g., down-conversion or analog-digital (A/D) conversion) on radio signals (i.e., OFDM signals in this case) received via antenna 201 at the reception band and outputs resultant received signals to CP removing section 203. The received signals may include a PDSCH signal, DCI, and upper layer control information including configuration information and search space information. The DCI (allocation control information) directed to terminal 200 is allocated to a common search space (C-SS) configured for terminal 200 and other terminals or to a unique search space (UE-SS) configured for terminal 200.

CP removing section 203 removes a CP from the received signals and FFT section 204 converts the received signals from which the CP is removed into frequency domain signals. The frequency domain signals are output to demultiplexing section 205.

Demultiplexing section 205 outputs a component of signals received from FFT section 204 (i.e., signals extracted from a PDCCH region and an R-PDCCH region) that may include DCI to PDCCH receiving section 207. Demultiplexing section 205 also outputs upper layer control signals (e.g., RRC signaling) including configuration information to configuration information receiving section 206 and data signals (i.e., PDSCH signals) to PDSCH receiving section 208. Further, demultiplexing section 205 extracts signal components corresponding to the PCFICH signal, from the signals received from FFT section 204, and outputs the signal components to PCFICH receiving section 216.

Configuration information receiving section 206 reads band information configured for its own terminal, information indicating a terminal ID configured for its own terminal, search space information configured for its own terminal, information indicating a reference signal configured for its own terminal, and information indicating a transmission mode configured for its own terminal, from the control signals of the upper layer input from demultiplexing section 205.

The band information configured for its own terminal is output to PDCCH receiving section 207, RF receiving section 202 and RF transmitting section 215. The information indicating a terminal ID configured for its own terminal is output to PDCCH receiving section 207 as terminal ID information. The search space region information is output to PDCCH receiving section 207. The information indicating a reference signal configured for its own terminal is output to PDCCH receiving section 207 as reference signal information. The information indicating a transmission mode configured for its own terminal is output to PDCCH receiving section 207 as transmission mode information.

PCFICH receiving section 216 identifies a PDCCH region scale on the basis of the CFI contained in the PCFICH signal received from demultiplexing section 205, and outputs the PDCCH region scale value to PDCCH receiving section 207.

PDCCH receiving section 207 blind-decodes (monitors) the signals input from demultiplexing section 205 to obtain DCI directed to its own terminal. PDCCH receiving section 207 performs blind-decoding for a DCI format for the allocation of data common to all the terminals (for example, DCI 0/1A), a DCI format dependent on the transmission mode configured for the terminal (for example, DCI 1, DCI 1B, DCI 1D, DCI 2, DCI 2A, DCI 0A, and DCI 0B), and a DCI format for the allocation of channels common to all the terminals (for example, DCI 1C and DCI 1A). This operation creates DCI including allocation control information on the DCI formats.

Specifically, PDCCH receiving section 207 first extracts a CCE resource of the PDCCH region from the reception signal, on the basis of the PDCCH region scale value received from PCFICH receiving section 216. If a region indicated by search space region information received from configuration information receiving section 206 is a PDCCH region, PDCCH receiving section 207 blind-decodes, for a C-SS indicated by the search space region information, the DCI formats for common channel allocation (DCI 1C and DCI 1A) and the DCI format for the allocation of data common to all the terminals (DCI 0/1A). Specifically, for each region candidate for blind-decoding in a C-SS (i.e., candidates of a CCE region allocated to terminal 200), PDCCH receiving section 207 demodulates and decodes the size of the DCI format for common channel allocation and the size of the DCI format for the allocation of data common to all the terminals. For the decoded signals, PDCCH receiving section 207 demasks CRC bits with an ID common to a plurality of terminals. PDCCH receiving section 207 then determines signals for which "CRC=OK" is found (i.e. no error is found) as a result of the demasking to be DCI including allocation control information for a common channel. For the decoded signals, PDCCH receiving section 207 further demasks the CRC bits with the ID of the terminal indicated by the terminal ID information. PDCCH receiving section 207 then determines signals for which "CRC=OK" is found (i.e. no error is found) as a result of the demasking to be DCI including allocation control information for the terminal. In other words, PDCCH receiving section 207 determines, in a C-SS, whether allocation control information on DCI 0/1A is for a common channel or for the allocation of data to the terminal with a terminal ID (i.e., an ID common to a plurality of terminals or the ID of terminal 200).

PDCCH receiving section 207 calculates a UE-SS for its own terminal for each number of concatenated CCEs with its own terminal ID indicated by the terminal ID information input from configuration information receiving section 206. For each blind decoding region candidate in the obtained UE-SS (CCE candidate for each number of concatenated CCEs), PDCCH receiving section 207 then demodulates and decodes the size of the DCI format corresponding to the transmission mode configured for the terminal (the transmission mode indicated by the transmission mode information) and the size of the DCI format common to all the terminals (DCI 0/1A). For the decoded signals, PDCCH receiving section 207 demasks CRC bits with the ID of the terminal. PDCCH receiving section 207 determines signals for which "CRC=OK" is found (i.e. no error is found) as a result of demasking to be DCI directed to its own terminal.

Here, in the case where the PDCCH region scale value received from PCFICH receiving section 216 is equal to or more than a predetermined threshold value (which is the same as the above-mentioned predetermined threshold value used by base station 100), PDCCH receiving section 207 performs blind decoding on the search space in the R-PDCCH region. On the other hand, in the case where the PDCCH region scale value is less than the predetermined threshold value, PDCCH receiving section 207 does not perform blind decoding on the search space in the R-PDCCH region. Here, the predetermined threshold value is defined as the maximum value of the PDCCH region scale value, and hence PDCCH receiving section 207 performs blind decoding on the search space in the R-PDCCH region only in the case of the maximum value.

Upon reception of downlink allocation control information, PDCCH receiving section 207 outputs downlink resource allocation information in the DCI directed to its own terminal to PDSCH receiving section 208. Upon reception of uplink allocation control information, PDCCH receiving section 207 outputs uplink resource allocation information to mapping section 212. PDCCH receiving section 207 also outputs the CCE number for the CCE used for the transmission of the DCI directed to its own terminal (i.e., CCE used for the transmission of the signals for which "CRC=OK" is found) to mapping section 212 (CCE number for the leading CCE if a plurality of CCEs are concatenated).

PDSCH receiving section 208 extracts received data (i.e., downlink data) from the PDSCH signals from demultiplexing section 205 on the basis of the downlink resource allocation information received from PDCCH receiving section 207. That is, PDSCH receiving section 208 receives downlink data (downlink data signal) on the basis of the downlink resource allocation information (allocation control information) directed to terminal 200 allocated to any of the plurality of DCI allocation region candidates (blind decoding region candidates). PDSCH receiving section 208 also detects any error in the extracted received data (i.e., downlink data). If an error is found in the received data as a result of the error detection, PDSCH receiving section 208 generates NACK signals as ACK/NACK signals. If no error is found in the received data, PDSCH receiving section 208 generates ACK signals as ACK/NACK signals. The ACK/NACK signals are output to modulating section 209.

Modulating section 209 modulates the ACK/NACK signals input from PDSCH receiving section 208 and outputs the modulated ACK/NACK signals to mapping section 212.

Modulating section 210 modulates transmission data (i.e., uplink data) and outputs the modulated data signal to DFT section 211.

DFT section 211 converts the data signals input from modulating section 210 into the frequency domain and outputs a plurality of resultant frequency components to mapping section 212.

Mapping section 212 maps the frequency components received from DFT section 211 to a PUSCH in accordance with the uplink resource allocation information received from PDCCH receiving section 207. Mapping section 212 also identifies a PUCCH in accordance with the CCE number received from PDCCH receiving section 207. Mapping section 212 then maps the ACK/NACK signals input from modulating section 209 to the identified PUCCH.

IFFT section 213 converts the plurality of frequency components mapped to the PUSCH into a time domain waveform. CP adding section 214 adds a CP to the time domain waveform.

RF transmitting section 215 can vary the range for transmission. RF transmitting section 215 determines a specific transmission range on the basis of the band information received from configuration information receiving section 206. RF transmitting section 215 then performs transmission radio processing (for example, up-conversion or digital-analog (D/A) conversion) on the CP-added signals and transmits the resultant signals via antenna 201.

[Operations of Base Station 100 and Terminal 200]

Operations of base station 100 and terminal 200 having configurations described above are described.

In base station 100, control section 102 decides the size of the PDCCH region (that is, the PDCCH region scale value) in accordance with the number of allocation target terminals (including both LTE terminals and LTE-A terminals). The PDCCH region scale value is decided on the basis of the number of pieces of DCI to be transmitted within the same subframe and the amount of required resource. Control section 102 outputs the decided PDCCH region scale value to transmission region configuration section 131, PDCCH generating section 104, and PCFICH generating section 109.

Transmission region configuration section 131 configures a resource region to be used for transmission of the DCI directed to terminal 200, on the basis of the value indicated by the PDCCH region scale information (that is, the PDCCH region scale value) received from control section 102.

Specifically, in the case where the PDCCH region scale value is less than a predetermined threshold value, transmission region configuration section 131 determines that the current status is normal, and configures the PDCCH region to terminal 200. On the other hand, in the case where the PDCCH region scale value is equal to or more than the predetermined threshold value, transmission region configuration section 131 determines that the PDCCH region may become tight because a large number of terminals 200 communicate under the control of base station 100, and configures both the PDCCH region and the R-PDCCH region (or only the R-PDCCH region) to terminal 200.

In the case where both the PDCCH region and the R-PDCCH region are configured as the DCI transmission regions, search space configuration section 103 configures search spaces (C-SS and UE-SS) including the plurality of DCI allocation region candidates, to the PDCCH region and the R-PDCCH region.

PCFICH generating section 109 generates a PCFICH signal on the basis of the PDCCH region scale value received from control section 102. PCFICH generating section 109 transmits the PCFICH signal through multiplexing section 110, IFFT section 111, CP adding section 112, and RF transmitting section 113.

Figure 10:
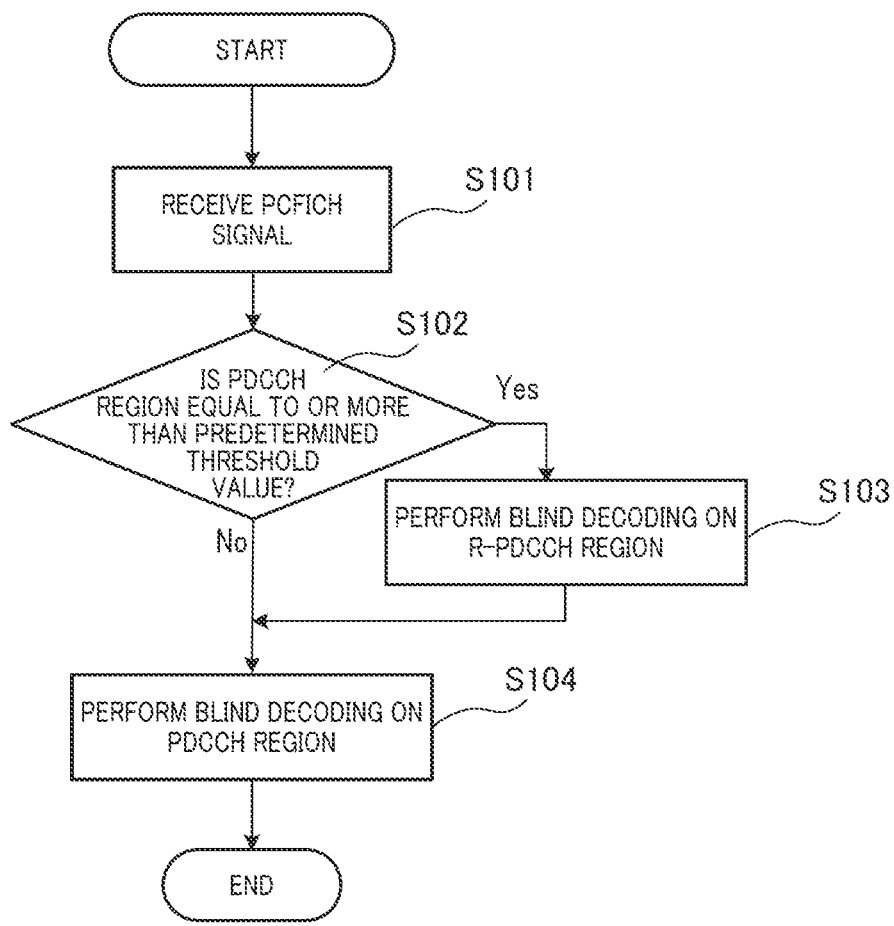
FIG. 10 is a flow chart for explaining an operation of the terminal.

FIG. 10 is a flow chart for explaining an operation of terminal 200.

In Step S101, PCFICH receiving section 216 identifies a PDCCH region scale on the basis of the CFI contained in the PCFICH signal received from demultiplexing section 205, and outputs the PDCCH region scale value to PDCCH receiving section 207.

In Step S102, PDCCH receiving section 207 determines whether or not the PDCCH region scale value received from PCFICH receiving section 216 is equal to or more than a predetermined threshold value (here, the maximum value of the PDCCH region scale value).

If it is determined in Step S102 that the PDCCH region scale value is equal to or more than the predetermined threshold value, in Step S103, PDCCH receiving section 207 performs blind decoding on the R-PDCCH region.

In Step S104, PDCCH receiving section 207 performs blind decoding on the PDCCH region.

On the other hand, if it is determined in Step S102 that the PDCCH region scale value is less than the predetermined threshold value, in Step S104, PDCCH receiving section 207 performs blind decoding on the PDCCH region, and does not perform blind decoding on the R-PDCCH region.

In this way, the DCI directed to its own terminal is extracted.

As described above, according to the present embodiment, base station 100 maps the downlink allocation control information unit (that is, the DCI) directed to terminal 200, to the first resource region (that is, the R-PDCCH region) usable as both the downlink control channel region and the downlink data channel region or to the second resource region (that is, the PDCCH region) usable as only the downlink control channel region, and base station 100 transmits the mapped DCI. In base station 100, control section 102 sets the scale of the PDCCH region, and transmission region configuration section 131 configures the mapping region to which the DCI is to be mapped, in the R-PDCCH region and the PDCCH region on the basis of the scale value (that is, the CFI value) set by control section 102.

As a result, the mapping region of the DCI can be configured in the R-PDCCH region or the PDCCH region in accordance with the CFI value that serves as an index concerning the tightness level of the PDCCH region, and hence the R-PDCCH region can be used as the mapping region in accordance with the tightness level of the PDCCH region.

Further, only in the case where the set scale value is equal to or more than a threshold value, transmission region configuration section 131 configures the R-PDCCH region as the mapping region. Specifically, the threshold value here is the maximum value of the scale value candidate group of the PDCCH region.

Here, erroneously detecting DCI directed to another terminal as DCI directed to its own terminal in spite of the fact that DCI decoding results are correct is equivalent to receiving only a corresponding portion of CRC bits masked by a terminal ID in base station 100, in a state different from its transmission state. In other words, this is equivalent to the case where only a portion (that is, a bit portion in which the erroneously detected DCI is different from the terminal ID of the allocation target terminal) of the CRC bits is erroneous.

Then, erroneously detecting DCI directed to another terminal as DCI directed to its own terminal in spite of the fact that DCI decoding results are correct occurs in the case where a consecutive bit group having the same length as that of the CRC bits is erroneous. Hence, such erroneous detection does not occur unless two terminal IDs all the constituent bits of which are different from each other are respectively allocated to two terminals.

Meanwhile, in the case where random errors occur in the DCI decoding results (that is, in the case where blind decoding is performed on a resource to which DCI (including DCI directed to another terminal) is not actually mapped), erroneous detection occurs at the probability that a random bit sequence is erroneous consecutively for the CRC length. That is, erroneous detection occurs at the probability expressed below by equation 1.

[1]

$$P = 1 - \left(1 - \left(\frac{1}{2^K}\right)\right)^M \quad \text{(Equation 1)}$$

In equation 1, K denotes the CRC length, and M denotes the number of blind decoding operations.

Further, the R-PDCCH region can be used for data transmission. Hence, in the case where the number of control channels as transmission targets is small, the R-PDCCH region is not used, and only the PDCCH region is used in many cases. That is, in the PDCCH region, DCI (including DCI directed to another terminal) is actually transmitted in many cases.

Consequently, in the PDCCH region, the probability that DCI convolutional decoding results are correct is high, and hence the probability of erroneous detection occurrence is low as described above.

In contrast, in the R-PDCCH region, a data signal may be transmitted instead of DCI, and hence the probability that DCI convolutional decoding results are erroneous is high, with the result that the probability of erroneous detection occurrence is also high.

In contrast, as described above, transmission region configuration section 131 configures the R-PDCCH region as the mapping region only in the case where the set scale value is equal to or more than a threshold value, thus enabling a reduction in the frequency that the R-PDCCH region having a probability of erroneous detection occurrence higher than that of the PDCCH region is used as the mapping region. That is, the opportunity that DCI is transmitted using the R-PDCCH can be limited. As a result, the probability of erroneous detection occurrence in the entire system can be reduced, and hence a decrease in system throughput can be prevented. Here, the R-PDCCH region is used as the mapping region mainly in the case where the PDCCH region is tight. Consequently, in the case where the scale value of the PDCCH region is not the maximum value, the R-PDCCH region is less likely to be used as the mapping region. Accordingly, in the case where the scale value of the PDCCH region is equal to or less than a predetermined threshold value, even if the R-PDCCH region is excluded from the mapping region, the opportunity of allocating downlink data to terminal 200 is less likely to be lost. That is, the probability of erroneous detection occurrence in the entire system can be reduced without losing the opportunity of allocating downlink data to terminal 200.

Further, in terminal 200, in the first resource region (that is, the R-PDCCH region) usable as both the downlink control channel region and the downlink data channel region or in the second resource region (that is, the PDCCH region) usable as only the downlink control channel region, demultiplexing section 205 and PCFICH receiving section 216 receive a downlink allocation control information unit (that is, DCI) including cyclic redundancy check (CRC) bits masked or scrambled by discrimination information of a destination terminal, and also receive scale information indicating the scale set in the PDCCH region. PDCCH receiving section 207 identifies a detection target resource region in the R-PDCCH region and the PDCCH region on the basis of the scale information. In the identified detection target resource region, PDCCH receiving section 207 detects a downlink allocation control information unit directed to its own terminal with reference to the discrimination information of its own terminal as a detection criterion. Here, terminal 200 sets whether or not the R-PDCCH should be subjected to blind decoding, in accordance with the scale information, and hence additional control information is unnecessary.

Further, only in the case where the scale value indicated by the scale information is equal to or more than a threshold value, PDCCH receiving section 207 identifies the R-PDCCH region as the detection target resource region. Specifically, the threshold value is the maximum value of the scale value candidate group of the PDCCH region.

Here, the present embodiment can be modified in the following manner.

Modified Example 1

In base station 100, transmission region configuration section 131 configures, for each target terminal 200, whether or not the R-PDCCH region should be added to the resource region used for transmission of the DCI, on the basis of the value indicated by the PDCCH region scale information (that is, the PDCCH region scale value) received from control section 102, and notifies the configuration result for each target terminal 200. As a result, base station 100 can set the blind decoding frequency of the R-PDCCH for each terminal 200, and thus can control the DCI erroneous detection rate. For example, in the case where the number of terminals 200 is large, base station 100 increases the number of terminals 200 to which base station 100 sets whether or not the R-PDCCH region should be added to the resource region used for transmission of the DCI (that is, reduces the number of terminals for which blind decoding is performed on the R-PDCCH), on the basis of the PDCCH region scale value, whereby the erroneous detection rate of the entire system is suppressed from increasing. On the other hand, in the case where the number of terminals 200 is small, base station 100 reduces the number of terminals to which base station 100 sets whether or not the R-PDCCH region should be added to the resource region used for transmission of the DCI, on the basis of the PDCCH region scale value, whereby the degree of freedom in DCI allocation can be secured.

Modified Example 2

In base station 100, in the case where the value indicated by the PDCCH region scale information (that is, the PDCCH region scale value) received from control section 102 is less than a predetermined threshold value, only when the downlink allocation control information unit is a given format of a plurality of formats, transmission region configuration section 131 configures the R-PDCCH region as the mapping region of the DCI. Then, in the case where the PDCCH region scale value is equal to or more than the predetermined threshold value, transmission region configuration section 131 does not limit the format of the DCI mapped to the R-PDCCH region.

Further, in terminal 200, in the case where the PDCCH region scale value is less than a threshold value, PDCCH receiving section 207 sets only the DCI that is a given format of the plurality of formats, as the detection target (that is, the blind decoding target). Then, in the case where the PDCCH region scale value is equal to or more than the predetermined threshold value, PDCCH receiving section 207 does not limit the DCI format as the detection target.

The given format described above is, for example, the DCI 0/1A. In this case, blind decoding of the DCI 0/1A, in which terminal 200 is used in a fallback mode, is performed irrespective of the scale of the PDCCH region, and hence base station 100 can always allocate DCI to terminal 200. That is, a certain degree of freedom in DCI allocation is secured while the blind decoding frequency of the R-PDCCH is reduced, whereby the erroneous detection rate can be efficiently reduced.

Note that base station 100 may set which DCI format should be defined as the given format, and may notify configuration information to terminal 200.

Modified Example 3

In base station 100, in the case where the PDCCH region scale value is less than a predetermined threshold value, transmission region configuration section 131 makes such configuration that the number of DCI allocation region candidates that form the mapping region is smaller than that when the PDCCH region scale value is equal to or more than the threshold value.

Further, in terminal 200, in the case where the PDCCH region scale value is less than a predetermined threshold value, PDCCH receiving section 207 makes such setting that the number of decoding target unit region candidates that form the mapping region is smaller than that when the PDCCH region scale value is equal to or more than the threshold value. For example, for a predetermined number of DCI allocation region candidates (for example, 16 for the PDCCH and 16 for the R-PDCCH) set by base station 100, in the case where the PDCCH region scale value is equal to or more than the threshold value, terminal 200 performs blind decoding on all the decoding target unit region candidates (that is, 16 candidates) in the R-PDCCH region. Further, in the case where the PDCCH region scale value is less than the threshold value, terminal 200 performs blind decoding on half (that is, 8) of all the decoding target unit region candidates in the R-PDCCH region. Here, the number of decoding target unit region candidates may be reduced uniformly for every number of concatenated CCEs, and may be reduced, for example, only in the case where the number of concatenated CCEs is small.

As a result, a certain degree of freedom in DCI allocation by base station 100 to terminal 200 is secured, while the blind decoding frequency of the R-PDCCH is reduced, whereby the erroneous detection rate can be efficiently reduced. Note that, in the above description, the mapping region of the DCI is configured depending on whether or not the PDCCH region scale value is equal to or more than the predetermined threshold value, but the mapping region of the DCI may be configured depending on whether or not the PDCCH region scale value is the maximum value of the scale value candidate group.

Embodiment 2

In Embodiment 2, in a given subframe, only the PDCCH region is configured as the mapping region of the DCI. The basic configurations of a base station and a terminal of Embodiment 2 are common to those of Embodiment 1, and hence the configurations are described with reference to FIGS. 7 and 9.

In base station 100 of Embodiment 2, transmission region configuration section 131 configures the configuration of a subframe on a cell basis. That is, transmission region configuration section 131 configures a subframe for transmission of a broadcast channel (PBCH), a subframe for transmission of a synchronization channel (SCH), a subframe for transmission of a quality measurement pilot signal (CSI-RS), and the like. In LTE, the PBCH is transmitted in a subframe 1 (that is, the leading subframe in a frame), and the SCH is transmitted in subframes 1 and 6. Further, for the CSI-RS, an arbitrary subframe is configured as the transmission subframe on a frame basis (each frame including 10 subframes) or on an M-frame basis (for example, M=4), and the CSI-RS is transmitted in the configured transmission subframe. The CSI-RS is transmitted, for example, every 2, 5, 10, or 20 subframes. Terminal 200 is notified of the configuration information concerning these subframe types.

Even in the case where the PDCCH region scale value is equal to or more than a threshold value, in the given subframe, transmission region configuration section 131 does not configure the R-PDCCH region as the mapping region of the DCI, and configures only the PDCCH region as the mapping region of the DCI.

Specifically, if the current subframe is the PBCH transmission subframe, the SCH transmission subframe, or the CSI-RS transmission subframe, transmission region configuration section 131 configures only the PDCCH region as the mapping region of the DCI to every terminal 200.

In terminal 200 of Embodiment 2, configuration information receiving section 206 extracts subframe configuration information from the reception signal input from demultiplexing section 205, and outputs the subframe configuration information to PDCCH receiving section 207.

PDCCH receiving section 207 determines whether or not the current subframe (that is, the processing target subframe) is any of the PBCH transmission subframe, the SCH transmission subframe, and the CSI-RS transmission subframe, on the basis of the subframe configuration information. Then, in the case where the current subframe (that is, the processing target subframe) is any of the PBCH transmission subframe, the SCH transmission subframe, and the CSI-RS transmission subframe, PDCCH receiving section 207 identifies only the PDCCH region as the blind decoding target region. On the other hand, in the case where the current subframe (that is, the processing target subframe) is not any of the PBCH transmission subframe, the SCH transmission subframe, and the CSI-RS transmission subframe, PDCCH receiving section 207 identifies both the PDCCH region and the R-PDCCH region (or only the R-PDCCH region) as the blind decoding target region.

As described above, according to the present embodiment, in base station 100, even in the case where the PDCCH region scale value is equal to or more than the threshold value, in the given subframe, transmission region configuration section 131 does not configure the R-PDCCH region as the mapping region of the DCI, and configures only the PDCCH region as the mapping region of the DCI.

Further, in terminal 200, in the given subframe, PDCCH receiving section 207 identifies only the PDCCH region as the detection target resource region (that is, the blind decoding target region).

The given subframe described above is the PBCH transmission subframe, the SCH transmission subframe, or the CSI-RS transmission subframe.

Figure 11:
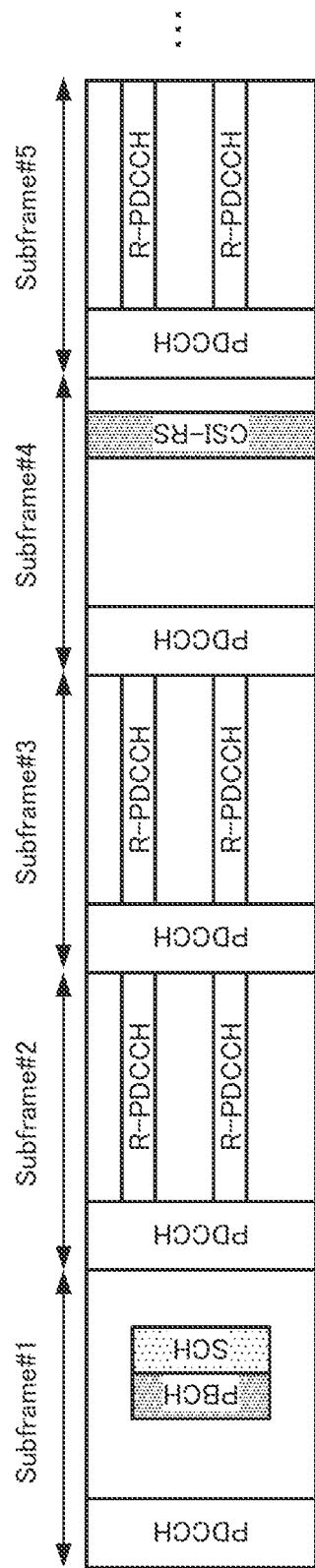
FIG. 11 is a diagram for explaining a configuration example of a subframe according to Embodiment 2 of the claimed invention.

Here, in the PBCH transmission subframe, the SCH transmission subframe, or the CSI-RS transmission subframe, part of resource elements (REs) in a resource block (RB) group are occupied by the PBCH, the SCH, or the CSI-RS (see FIG. 11). Hence, the number of REs usable for the R-PDCCH is smaller than that of the other subframes. Accordingly, in the given subframe, terminal 200 cannot receive the DCI at a sufficiently low error rate in the R-PDCCH region, or the DCI needs to be transmitted using a large amount of RB resource in the R-PDCCH region such that terminal 200 can receive the DCI at a sufficiently low error rate in the R-PDCCH region. Consequently, in the given subframe, the number of RBs used for data is smaller, and hence the data throughput may significantly decrease. Accordingly, in the given subframe, even if only the PDCCH region is configured as the mapping region of the DCI (or the blind decoding target region), the degree of freedom in scheduling by base station 100 does not decrease, and almost no decrease in system throughput occurs. That is, the blind decoding frequency of the R-PDCCH is reduced without a decrease in system throughput, whereby the erroneous detection rate can be efficiently reduced.

Note that, in addition to the PBCH, the SCH, and the CSI-RS, even in a subframe in which a channel or a signal that may decrease the number of REs usable for the R-PDCCH is arranged, only the PDCCH region is configured as the mapping region of the DCI (or the blind decoding target region), whereby similar effects can be obtained.

Embodiment 3

Figure 12:
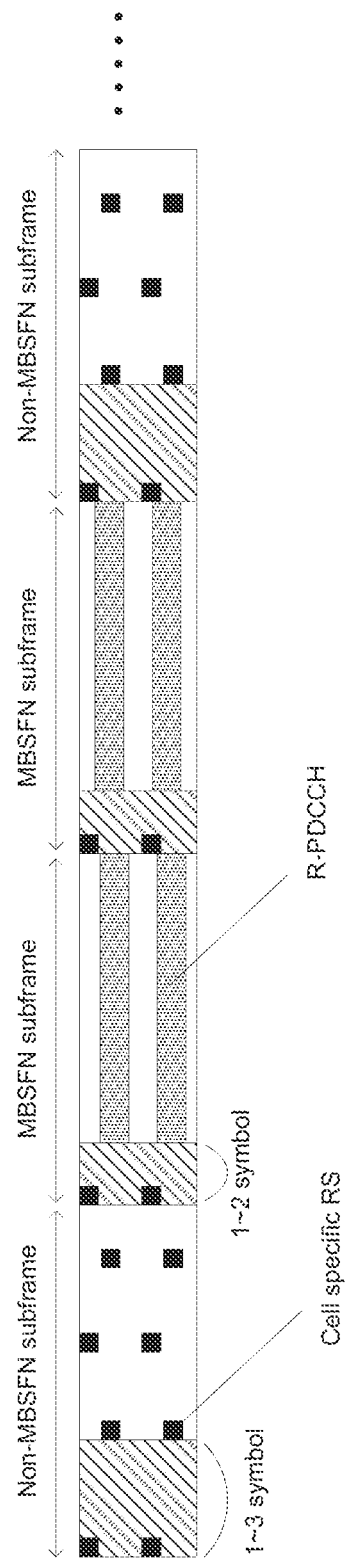
FIG. 12 is a diagram for explaining a MBSFN subframe according to Embodiment 3 of the claimed invention.

In Embodiment 3, in a given subframe, only the PDCCH region is configured as the mapping region of the DCI similarly to Embodiment 2. In Embodiment 3, the R-PDCCH directed to a terminal is transmitted from a base station to the terminal together with a demodulation reference signal (DMRS). That is, the terminal demodulates the R-PDCCH directed to the terminal using the DMRS. Further, Embodiment 3 adopts an operation using a MBSFN subframe in addition to a normal subframe (non-MBSFN subframe) (see FIG. 12). The basic configurations of a base station and a terminal of Embodiment 3 are common to those of Embodiment 1, and hence the configurations are described with reference to FIGS. 7 and 9.

In base station 100 of Embodiment 3, transmission region configuration section 131 configures the configuration of a subframe on a cell basis. That is, transmission region configuration section 131 configures a MBSFN subframe and a non-MBSFN subframe. Note that, in LTE, it is prohibited to configure subframes 0, 4, 5, and 9, in which a PBCH, a SCH (a primary synchronization signal and a secondary synchronization signal), or paging information may be transmitted in one frame (ten subframes), as the MBSFN subframe.

Further, in the non-MBSFN, transmission region configuration section 131 does not configure the R-PDCCH region as the mapping region of the DCI, and configures only the PDCCH region as the mapping region of the DCI. Specifically, if the current subframe is the non-MBSFN, transmission region configuration section 131 configures only the PDCCH region as the mapping region of the DCI to every terminal 200. Further, if the current subframe is the MBSFN subframe, transmission region configuration section 131 configures both the PDCCH region and the R-PDCCH region as the mapping region of the DCI to every terminal 200.

In terminal 200 of Embodiment 3, configuration information receiving section 206 extracts subframe configuration information from the reception signal input from demultiplexing section 205, and outputs the subframe configuration information to PDCCH receiving section 207.

PDCCH receiving section 207 determines whether the current subframe (that is, the processing target subframe) is the MBSFN subframe or the non-MBSFN subframe, on the basis of the subframe configuration information. Then, in the case where the current subframe (that is, the processing target subframe) is the non-MBSFN subframe, PDCCH receiving section 207 identifies only the PDCCH region as the blind decoding target region. On the other hand, in the case where the current subframe (that is, the processing target subframe) is the MBSFN subframe, PDCCH receiving section 207 identifies both the PDCCH region and the R-PDCCH region as the blind decoding target region.

Here, the DMRS is a reference signal that is transmitted for each terminal 200 to which data is allocated. Accordingly, unlike a common reference signal (CRS) that is always transmitted in every subframe, the DMRS is transmitted only in a downlink resource (which is identified by a subframe and a resource block (RB)) allocated to terminal 200. Then, the DMRS is transmitted for each terminal. Consequently, the DMRS can be transmitted by beamforming with precoding, and hence the reception quality in terminal 200 can be enhanced.

Further, in LTE (3GPP Release 8), the MBSFN subframe is used to transmit MBMS data (that is, multicast or broadcast data) from a plurality of base stations to terminals over a single frequency network (SFN). Then, in the MBSFN subframe, the mapping region of the PDCCH and a cell specific reference signal (CSRS) is limited to the OFDM symbols from leading to second ones, with the result that only the mapping region of the MBMS data can be configured in the third and subsequent OFDM symbols. Further, in LTE-A (Release 10), the MBSFN subframe is also used to transmit unicast data using the DMRS.

In the MBSFN subframe, the CRS is not included in the third and subsequent OFDM symbols.

In contrast, in a normal subframe (that is, the non-MBSFN subframe), the CRS is included also in the third and subsequent OFDM symbols. That is, because the CRS is a signal that may decrease the number of REs usable for the R-PDCCH, the number of REs usable for the R-PDCCH is smaller in the third and subsequent OFDM symbols of the non-MBSFN subframe than in that of the MBSFN subframe.

In view of this, in Embodiment 3, the PDCCH region and the R-PDCCH are configured as the mapping region of the DCI in the MBSFN subframe, and only the PDCCH region is configured as the mapping region of the DCI in the non-MBSFN subframe.

As described above, according to the present embodiment, in base station 100, in the given subframe, transmission region configuration section 131 does not configure the R-PDCCH region as the mapping region of the DCI, and configures only the PDCCH region as the mapping region of the DCI. The given subframe described above is the non-MBSFN subframe.

Further, according to the present embodiment, in terminal 200, in the given subframe, PDCCH receiving section 207 does not identify the R-PDCCH region as the detection target resource region (that is, the blind decoding target region), and identifies only the PDCCH region as the detection target resource region. The given subframe described above is the non-MBSFN subframe.

Here, as described above, in the MBSFN subframe, the PDCCH region is limited to the first two OFDM symbols. Further, the CRS is not included in the third and subsequent OFDM symbols (that is, the R-PDCCH region). Consequently, the CRS that may decrease the number of REs usable for the R-PDCCH does not exist in the third and subsequent OFDM symbols of the MBSFN subframe, and hence a larger amount of resource (that is, resource elements (REs)) can be used for the R-PDCCH. In contrast, in a normal subframe (non-MBSFN subframe), the CRS is included also in the third and subsequent OFDM symbols. Consequently, in the normal subframe (non-MBSFN subframe), the amount of resource usable for the R-PDCCH is smaller in the third and subsequent OFDM symbols. Accordingly, in the normal subframe (non-MBSFN subframe), terminal 200 cannot receive the DCI at a sufficiently low error rate in the R-PDCCH region, or the DCI needs to be transmitted using a large amount of RB resource in the R-PDCCH region such that terminal 200 can receive the DCI at a sufficiently low error rate in the R-PDCCH region. Consequently, in the normal subframe (non-MBSFN subframe), the number of RBs used for data is smaller, and hence the data throughput may significantly decrease. Accordingly, in the normal subframe (non-MBSFN subframe), even if only the PDCCH region is configured as the mapping region of the DCI (or the blind decoding target region), the degree of freedom in scheduling by base station 100 does not decrease, and almost no decrease in system throughput occurs. That is, the blind decoding frequency of the R-PDCCH is reduced without a decrease in system throughput, whereby the erroneous detection rate can be efficiently reduced.

Further, in the MBSFN subframe, the PDCCH region can be configured to only the OFDM symbols from leading to second ones. In contrast, in the normal subframe (non-MBSFN subframe), the PDCCH region can be configured in the OFDM symbols from leading to third ones. That is, in the normal subframe (non-MBSFN subframe), there is a high possibility that a resource to which the DCI directed to every allocation target terminal is mapped can be covered by only the PDCCH region. Accordingly, in the normal subframe (non-MBSFN subframe), even if only the PDCCH region is configured as the mapping region of the DCI (or the blind decoding target region), the degree of freedom in scheduling does not decrease, and almost no decrease in system throughput occurs. That is, the blind decoding frequency of the R-PDCCH is reduced without a decrease in system throughput, whereby the erroneous detection rate can be efficiently reduced. Note that, in the above description, in the non-MBSFN subframe, only the PDCCH region is configured as the mapping region of the DCI (or the blind decoding target region). However, the present embodiment is not limited thereto, and can be modified in the following manner.

Modified Example 1

In the non-MBSFN subframe, an R-PDCCH region that is more limited than the R-PDCCH region in the MBSFN subframe may be configured as the mapping region of the DCI (or the blind decoding target region), in addition to the PDCCH region. Even in this case, the number of blind decoding operations on the R-PDCCH can be reduced in the non-MBSFN subframe, compared with the MBSFN subframe, and hence the erroneous detection rate can be reduced.

Modified Example 2

In the MBSFN subframe, only the R-PDCCH region may be configured as the mapping region of the DCI (or the blind decoding target region). Here, in the MBSFN subframe, the PDCCH region exists at most in only two OFDM symbols, and hence a common channel (such as broadcasting and paging information) cannot be allocated thereto. Accordingly, in the MBSFN subframe, the PDCCH is less likely to be used. Consequently, in the MBSFN subframe, even if only the R-PDCCH region is configured as the mapping region of the DCI, almost no influence is exerted on the degree of freedom in scheduling by base station 100, and almost no decrease in system throughput occurs. That is, the blind decoding frequency of the PDCCH in the MBSFN subframe is reduced without a decrease in system throughput, whereby the erroneous detection rate can be reduced.

Modified Example 3

In the MBSFN subframe, a PDCCH region that is more limited than the PDCCH region in the non-MBSFN subframe may be configured as the mapping region of the DCI (or the blind decoding target region), in addition to the R-PDCCH region. In this case, the number of blind decoding operations on the R-PDCCH can be reduced in the MBSFN subframe, compared with the non-MBSFN subframe, and hence the erroneous detection rate can be reduced.

Modified Example 4

In the case where MBMS data is transmitted in the MBSFN subframe, in the MBSFN subframe, only the PDCCH region may be configured as the mapping region of the DCI (or the blind decoding target region). As a result, in a subframe that is less likely to be allocated as a data resource directed to terminal 200, the number of blind decoding operations on the R-PDCCH can be reduced. That is, the blind decoding frequency of the R-PDCCH is reduced without substantially any decrease in the degree of freedom in scheduling by base station 100, whereby the erroneous detection rate can be efficiently reduced.

Modified Example 5

Modified Examples 1 to 4 described above may be combined. For example, in the non-MBSFN subframe, only the PDCCH region may be configured as the mapping region of the DCI (or the blind decoding target region), and, in the MBSFN subframe, only the R-PDCCH region may be configured as the mapping region of the DCI (or the blind decoding target region). As a result, the erroneous detection rate can be reduced for the same reasons as those described above. In addition, because only one of the PDCCH region and the R-PDCCH region is configured as the blind decoding target region in each subframe, power consumption can be reduced without complicating the configuration of terminal 200.

According to the present embodiment and Modified Examples 1 to 5, in short, it is advisable that the number of decoding target unit region candidates that form the mapping region in the R-PDCCH region be configured to be smaller in a subframe (that is, the non-MBSFN subframe) other than a given subframe (here, the MBSFN subframe) than in the given subframe.

Moreover, the present embodiment can be combined with Embodiment 1. That is, in this case, in the case where the current subframe is the non-MBSFN subframe, even if the PDCCH region scale value is equal to or more than the threshold value, transmission region configuration section 131 of base station 100 configures only the PDCCH region as the mapping region of the DCI. Then, in the case where the current subframe is the MBSFN subframe, transmission region configuration section 131 configures the PDCCH region and the R-PDCCH region as the mapping region of the DCI if the PDCCH region scale value is equal to or more than the threshold value, and transmission region configuration section 131 configures only the PDCCH region as the mapping region of the DCI if the PDCCH region scale value is less than the threshold value.

Moreover, the present embodiment may be combined with Embodiment 2.

Embodiment 4

Figure 4:
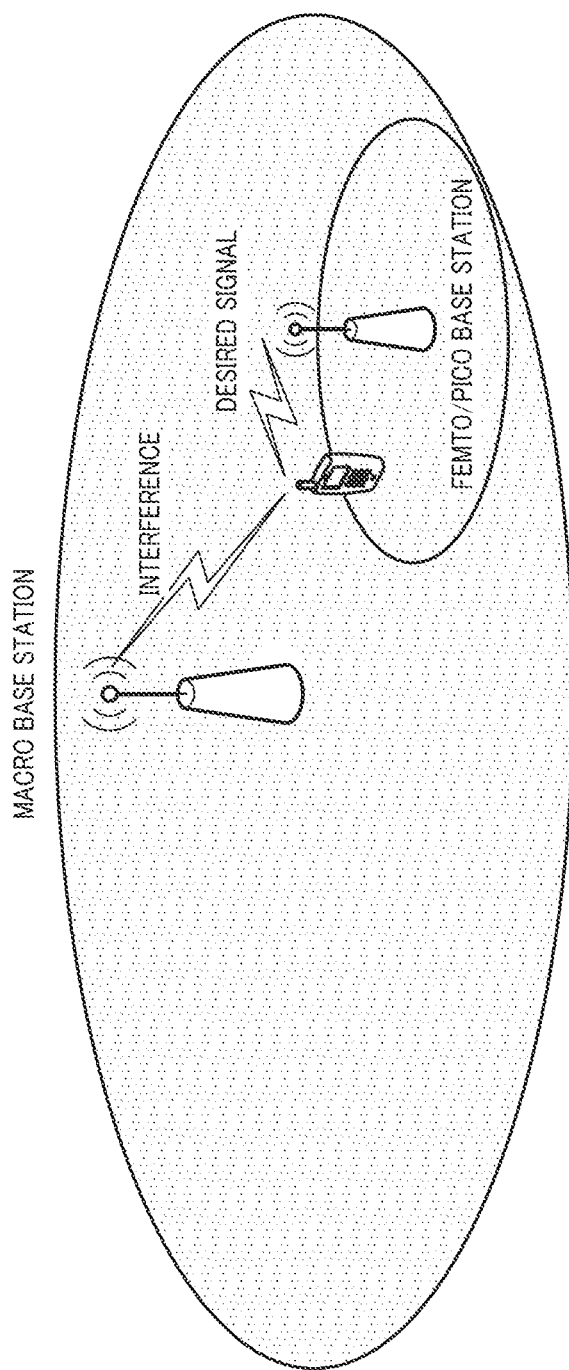
FIG. 4 is a diagram for explaining a heterogeneous network.

In Embodiment 4, in a given subframe, only the PDCCH region is configured as the mapping region of the DCI similarly to Embodiment 2. Embodiment 4 assumes a heterogeneous network. The heterogeneous network includes: a macro base station that forms a macrocell (that is, a cell having a large cell diameter); and pico base stations that form pico cells (that is, cells having a small cell diameter) scattered in the macrocell (see FIG. 4). In the following description, a terminal connected to the macro base station is referred to as "macro terminal", and a terminal connected to the pico base station is referred to as "pico terminal". The basic configurations of a base station and a terminal of Embodiment 4 are common to those of Embodiment 1, and hence the configurations are described with reference to FIGS. 7 and 9. In Embodiment 4, base station 100 is a macro base station, and terminal 200 is a macro terminal.

In base station 100 of Embodiment 4, transmission region configuration section 131 configures the configuration of a subframe on a cell basis. That is, transmission region configuration section 131 configures an almost blank subframe (ABS) and a non-ABS.

Further, in the non-ABS, transmission region configuration section 131 does not configure the R-PDCCH region as the mapping region of the DCI, and configures only the PDCCH region as the mapping region of the DCI. Specifically, if the current subframe is the non-ABS, transmission region configuration section 131 configures only the PDCCH region as the mapping region of the DCI to every terminal 200.

Here, the ABS refers to a subframe in which the macro base station makes its transmission power smaller (for example, a subframe in which signals and channels other than a CRS, a necessary broadcast channel, and a necessary synchronization channel are not transmitted). Then, for example, one or more subframes are configured as the ABSs on a 40-ms basis.

In terminal 200 of Embodiment 4, configuration information receiving section 206 extracts subframe configuration information from the reception signal input from demultiplexing section 205, and outputs the subframe configuration information to PDCCH receiving section 207.

PDCCH receiving section 207 determines whether the current subframe (that is, the processing target subframe) is the ABS or the non-ABS, on the basis of the subframe configuration information. Then, in the case where the current subframe (that is, the processing target subframe) is the non-ABS, PDCCH receiving section 207 identifies only the PDCCH region as the blind decoding target region. On the other hand, in the case where the current subframe (that is, the processing target subframe) is the ABS, PDCCH receiving section 207 identifies both the PDCCH region and the R-PDCCH region as the blind decoding target region.

Figure 13:
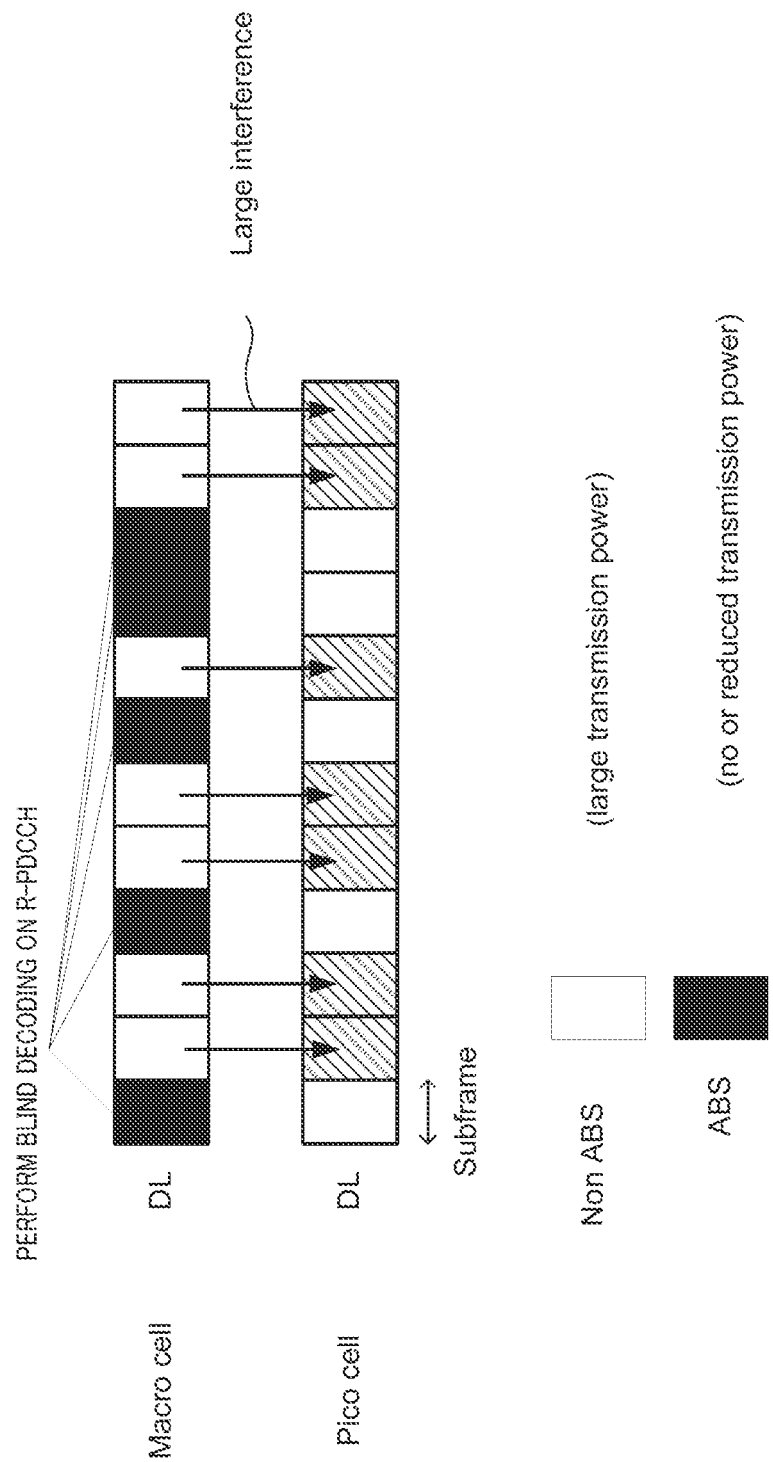
FIG. 13 is a diagram for explaining an almost blank subframe (ABS) and interference from macrocell to picocell according to Embodiment 4 of the claimed invention.

Here, in the heterogeneous network, a signal transmitted from the macro base station to the macro terminal significantly interferes with the pico terminal (that is, intercell interference), and hence the coverage area of the pico cell becomes unfavorably smaller. In view of this, the almost blank subframe (ABS) is used in order to reduce such interference from the macro base station to the pico terminal and enlarge the coverage area of the pico cell (see FIG. 13). Then, in the ABS, instead of transmitting no data in every RB, the macro base station transmits data using part of the RBs that are not used by the pico base station, for example, in the case where the amount of transmitted data of the pico base station is small. This brings about better resource usage efficiency. Meanwhile, the PDCCH is transmitted using resources that are randomly scattered for each cell over all bands. Hence, in the ABS, if the macro base station uses the PDCCH even a little for transmission of the DCI, the PDCCH directed to the pico terminal is unfavorably interfered thereby. Accordingly, in the ABS, the macro base station allocates a data resource to the macro terminal using the R-PDCCH, to thereby enable data allocation without interference with the pico terminal. Moreover, beamforming transmission using a DMRS is applied to the R-PDCCH, whereby interference with the pico terminal can be reduced.

As described above, according to the present embodiment, in base station 100, in the given subframe, transmission region configuration section 131 does not configure the R-PDCCH region as the mapping region of the DCI, and configures only the PDCCH region as the mapping region of the DCI. The given subframe described above is the non-ABS.

Further, according to the present embodiment, in terminal 200, in the given subframe, PDCCH receiving section 207 does not identify the R-PDCCH region as the detection target resource region (that is, the blind decoding target region), and identifies only the PDCCH region as the detection target resource region. The given subframe described above is the non-ABS.

Here, as described above, in the heterogeneous network, the R-PDCCH directed to the terminal is used mainly in the ABS in the macrocell. Consequently, the frequency resource of the ABS in the macrocell can be effectively used without any large interference with the pico terminal. As a result, the system throughput can be enhanced. Meanwhile, in the non-ABS, a decrease in throughput caused by limiting the degree of freedom in resource allocation is considered to be small, even if the R-PDCCH region is not configured as the mapping region of the DCI. Accordingly, in the non-ABS, only the PDCCH region is configured as the mapping region of the DCI, and the number of blind decoding operations on the R-PDCCH is reduced while the decrease in throughput is suppressed, whereby the erroneous detection rate can be reduced.

Note that, in the above description, in the non-ABS, only the PDCCH region is configured as the mapping region of the DCI (or the blind decoding target region). However, the present embodiment is not limited thereto, and can be modified in the following manner.

Modified Example 1

In the non-ABS, an R-PDCCH region that is more limited than the R-PDCCH region in the ABS may be configured as the mapping region of the DCI (or the blind decoding target region), in addition to the PDCCH region. Even in this case, the number of blind decoding operations on the R-PDCCH can be reduced in the non-ABS, compared with the ABS, and hence the erroneous detection rate can be reduced.

Modified Example 2

In the ABS, only the R-PDCCH region may be configured as the mapping region of the DCI (or the blind decoding target region). Here, in the ABS, transmission using the PDCCH region is avoided as much as possible in order not to cause interference with the pico terminal, and hence the PDCCH is less likely to be used. Consequently, even if only the R-PDCCH region is configured as the mapping region of the DCI, almost no influence is exerted on the degree of freedom in scheduling, and almost no decrease in system throughput occurs. That is, the blind decoding frequency of the PDCCH in the ABS is reduced without a decrease in system throughput, whereby the erroneous detection rate can be reduced.

Modified Example 3

In the ABS, a PDCCH region that is more limited than the PDCCH region in the non-ABS may be configured as the mapping region of the DCI (or the blind decoding target region), in addition to the R-PDCCH region. In this case, the number of blind decoding operations on the R-PDCCH can be reduced in the ABS, compared with the non-ABS, and hence the erroneous detection rate can be reduced.

Modified Example 4

For example, in the case of the following operation, in the ABS, only the PDCCH region may be configured as the mapping region of the DCI (or the blind decoding target region). In the operation, no data is transmitted in the ABS of the macrocell in order to place priority on coverage area enlargement of the pico cell. At this time, the PDCCH region is used to enable base station 100 to notify minimum common channel information (such as broadcasting and paging information) in the ABS. As a result, in a subframe that is less likely to be allocated as a data resource directed to terminal 200, the number of blind decoding operations on the R-PDCCH can be reduced. That is, the blind decoding frequency of the R-PDCCH is reduced without substantially any decrease in the degree of freedom in scheduling by base station 100, whereby the erroneous detection rate can be efficiently reduced.

According to the present embodiment and Modified Examples 1 to 4, in short, it is advisable that the number of decoding target unit region candidates that form the mapping region in the R-PDCCH region be set to be smaller in a subframe (that is, the non-ABS) other than a given subframe (here, the ABS) than in the given subframe.

Moreover, the macro base station may explicitly notify the ABS to the macro terminal, and may implicitly notify the ABS thereto. In the case where the macro base station implicitly notifies the ABS, the macro base station may notify, as subsets of the subframe, two types of subsets to the terminal. Then, the macro terminal may regard the first subset as the non-ABS, and regard the second subset as the ABS. Then, the two types of subsets may be defined as, for example, csi-SubframeSet1 and csi-SubframeSet2 in Rel 10. Csi-SubframeSet1 and csi-SubframeSet2 in Rel 10 are used to distinguish CSI measurements of two types of subframes having different interference or signal power, at the time of CSI reporting. Alternatively, the macro terminal may regard a subframe for which the measurement target is limited at the time of quality measurement for terminal movement control, as the non-ABS, and may regard other subframes as the ABSs. The base station notifies the terminal of the former as measSubframePattern.

Moreover, the present embodiment can be combined with Embodiment 1. That is, in this case, in the case where the current subframe is the non-ABS, even if the PDCCH region scale value is equal to or more than the threshold value, transmission region configuration section 131 of base station 100 configures only the PDCCH region as the mapping region of the DCI. Then, in the case where the current subframe is the ABS, transmission region configuration section 131 configures the PDCCH region and the R-PDCCH region as the mapping region of the DCI if the PDCCH region scale value is equal to or more than the threshold value, and transmission region configuration section 131 configures only the PDCCH region as the mapping region of the DCI if the PDCCH region scale value is less than the threshold value.

Moreover, the present embodiment may be combined with Embodiment 2.

Embodiment 5

In Embodiment 5, in a given subframe, only the PDCCH region is configured as the mapping region of the DCI similarly to Embodiment 2. Embodiment 5 assumes a heterogeneous network. The basic configurations of a base station and a terminal of Embodiment 5 are common to those of Embodiment 1, and hence the configurations are described with reference to FIGS. 7 and 9. In Embodiment 5, base station 100 is a pico base station, and terminal 200 is a pico terminal. In the following description, an ABS set in the macrocell is referred to as macro ABS, and a non-ABS set in the macrocell is referred to as macro non-ABS.

In base station 100 of Embodiment 5, transmission region configuration section 131 configures the configuration of a subframe on a cell basis. That is, transmission region configuration section 131 configures the macro ABS and the macro non-ABS. Here, configuration information of the macro ABS and the macro non-ABS is notified from the macro base station to the pico base station, using communication through an X2 interface or an optical fiber line between the base stations.

Further, in the macro ABS, transmission region configuration section 131 does not configure the R-PDCCH region as the mapping region of the DCI, and configures only the PDCCH region as the mapping region of the DCI. Specifically, if the current subframe is the macro ABS, transmission region configuration section 131 configures only the PDCCH region as the mapping region of the DCI to every terminal 200.

In terminal 200 of Embodiment 5, configuration information receiving section 206 extracts subframe configuration information from the reception signal input from demultiplexing section 205, and outputs the subframe configuration information to PDCCH receiving section 207.

PDCCH receiving section 207 determines whether the current subframe (that is, the processing target subframe) is the macro ABS or the macro non-ABS, on the basis of the subframe configuration information. Then, in the case where the current subframe (that is, the processing target subframe) is the macro ABS, PDCCH receiving section 207 identifies only the PDCCH region as the blind decoding target region. On the other hand, in the case where the current subframe (that is, the processing target subframe) is the macro non-ABS, PDCCH receiving section 207 identifies both the PDCCH region and the R-PDCCH region (or only the R-PDCCH region) as the blind decoding target region.

Figure 14:
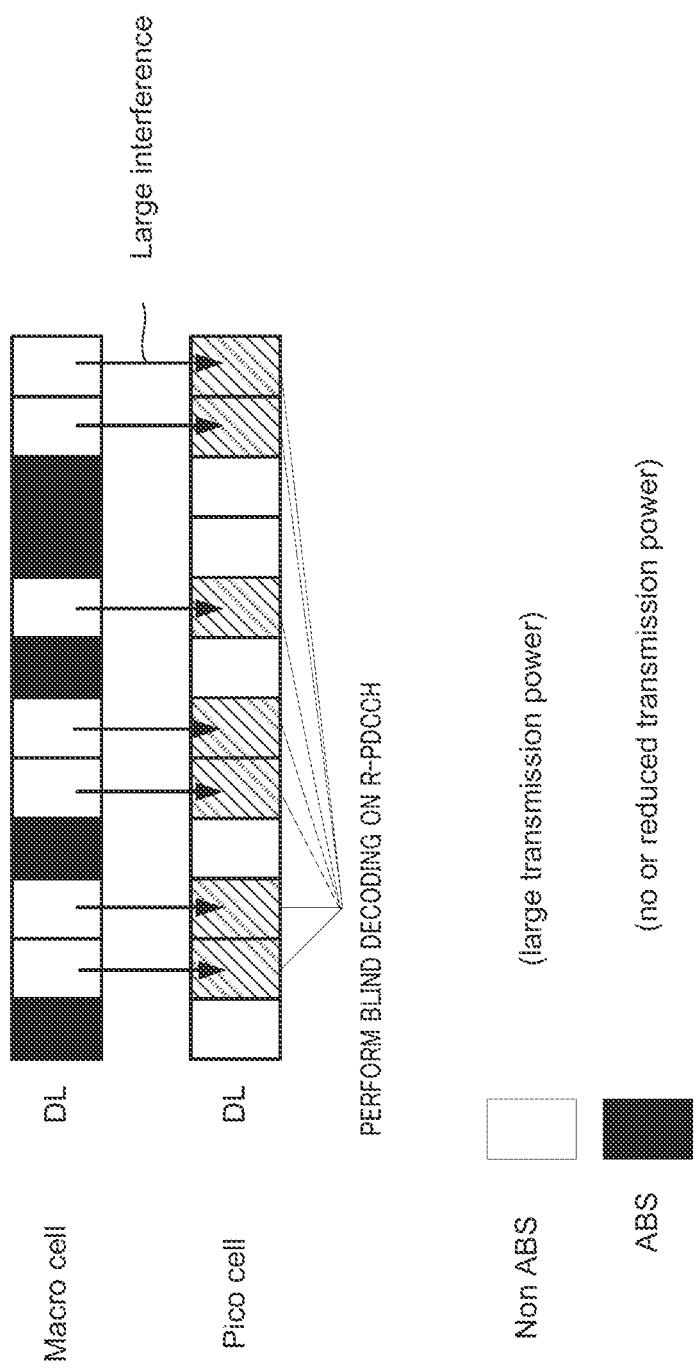
FIG. 14 is a diagram for explaining macro ABS and interference from macrocell to picocell according to an embodiment of the claimed invention.

Here, interference from the macrocell to the pico terminal is small in the macro ABS, and is large in the macro non-ABS (see FIG. 14). Because the interference from the macrocell to the pico terminal is large in the macro non-ABS, the SINR of the PDCCH in the pico cell is highly likely to be unsatisfactory. In contrast, because the interference from the macrocell to the pico terminal is small in the macro ABS, the SINR of the PDCCH in the pico cell is highly likely to be satisfactory. Further, for the R-PDCCH in the pico cell, a high SINR can be obtained more easily even in the macro non-ABS because of: a beamforming effect produced by applying beamforming using a DMRS; a frequency scheduling effect produced by transmitting data using only a given RB; or an interference control effect produced by transmitting data using a RB that is not used in the macrocell. That is, in the pico cell, the R-PDCCH is the best suited to be used in the macro non-ABS. Consequently, in Embodiment 5, in the pico cell, only the PDCCH region is configured as the mapping region of the DCI in the macro ABS.

As described above, according to the present embodiment, in base station 100, in the given subframe, transmission region configuration section 131 does not configure the R-PDCCH region as the mapping region of the DCI, and configures only the PDCCH region as the mapping region of the DCI. The given subframe described above is the macro ABS.

Further, according to the present embodiment, in terminal 200, in the given subframe, PDCCH receiving section 207 does not identify the R-PDCCH region as the detection target resource region (that is, the blind decoding target region), and identifies only the PDCCH region as the detection target resource region. The given subframe described above is the macro ABS.

Here, as described above, in the pico cell, the R-PDCCH is the best suited to be used in the macro non-ABS that is highly likely to have poor reception quality in the PDCCH. That is, in the pico cell, in the macro ABS, a decrease in throughput caused by limiting the degree of freedom in resource allocation is considered to be small even if the R-PDCCH region is not configured as the mapping region of the DCI. Accordingly, in the pico cell, in the macro ABS, only the PDCCH is configured as the mapping region of the DCI, and the number of blind decoding operations on the R-PDCCH is reduced, whereby the erroneous detection rate can be reduced.

Note that, in the above description, in the macro ABS, only the PDCCH region is configured as the mapping region of the DCI (or the blind decoding target region). However, the present embodiment is not limited thereto, and can be modified in the following manner.

Modified Example 1

In the macro ABS, an R-PDCCH region that is more limited than the R-PDCCH region in the macro non-ABS may be configured as the mapping region of the DCI (or the blind decoding target region), in addition to the PDCCH region. Even in this case, the number of blind decoding operations on the R-PDCCH can be reduced in the macro ABS, compared with the macro non-ABS, and hence the erroneous detection rate can be reduced.

Modified Example 2

In the macro non-ABS, only the R-PDCCH region may be configured as the mapping region of the DCI (or the blind decoding target region). Here, in the macro non-ABS, the PDCCH region in which the interference from the macrocell to the pico terminal is large is less likely to be used as the mapping region of the DCI (or the blind decoding target region). That is, in the pico cell, in the macro non-ABS, even if only the R-PDCCH region is configured as the mapping region of the DCI, almost no influence is exerted on the degree of freedom in scheduling, and almost no decrease in system throughput occurs. That is, the blind decoding frequency of the PDCCH in the macro non-ABS is reduced without a decrease in system throughput, whereby the erroneous detection rate can be reduced.

Modified Example 3

In the macro non-ABS, a PDCCH region that is more limited than the PDCCH region in the macro ABS may be configured as the mapping region of the DCI (or the blind decoding target region), in addition to the R-PDCCH region. In this case, the number of blind decoding operations on the R-PDCCH can be reduced in the macro non-ABS, compared with the macro ABS, and hence the erroneous detection rate can be reduced.

Modified Example 4

For example, in the case of the following operation, in the macro non-ABS, only the PDCCH region may be configured as the mapping region of the DCI (or the blind decoding target region). In the operation, the pico cell is required to provide more robust communication (for example, the pico cell is required to have a lower data error rate). At this time, the PDCCH region is used to enable base station 100 to notify minimum common channel information (broadcasting and paging information) in the macro non-ABS. As a result, in a subframe that is less likely to be allocated as a data resource directed to terminal 200, the number of blind decoding operations on the R-PDCCH can be reduced. That is, the blind decoding frequency of the R-PDCCH is reduced without substantially any decrease in the degree of freedom in scheduling by base station 100, whereby the erroneous detection rate can be efficiently reduced.

According to the present embodiment and Modified Examples 1 to 4, in short, it is advisable that the number of decoding target unit region candidates that form the mapping region in the R-PDCCH region be set to be smaller in a subframe (that is, the macro non-ABS) other than a given subframe (here, the macro ABS) than in the given subframe.

Moreover, the pico base station may explicitly notify the macro ABS and the macro non-ABS to the pico terminal, and may implicitly notify the macro ABS and the macro non-ABS thereto. In the case where the pico base station implicitly notifies the macro ABS and the macro non-ABS, the pico base station may notify, as subsets of the subframe, two types of subsets to the terminal. Then, the pico terminal may regard the first subset as the macro non-ABS, and may regard the second subset as the macro ABS. Then, the two types of subsets may be defined as, for example, csi-SubframeSet1 and csi-SubframeSet2 in Rel 10. Csi-SubframeSet1 and csi-SubframeSet2 in Rel 10 are used to distinguish CSI measurements of two types of subframes having different interference or signal power, at the time of CSI reporting. Alternatively, the pico terminal may regard a subframe for which the measurement target is limited at the time of quality measurement for terminal movement control, as the macro non-ABS, and may regard other subframes as the macro ABSs. The base station notifies the terminal of the former as measSubframePattern.

Moreover, the present embodiment can be combined with Embodiment 1. That is, in this case, in the case where the current subframe is the macro ABS, even if the PDCCH region scale value is equal to or more than the threshold value, transmission region configuration section 131 of base station 100 configures only the PDCCH region as the mapping region of the DCI. Then, in the case where the current subframe is the macro non-ABS, transmission region configuration section 131 configures the PDCCH region and the R-PDCCH region as the mapping region of the DCI if the PDCCH region scale value is equal to or more than the threshold value, and transmission region configuration section 131 configures only the PDCCH region as the mapping region of the DCI if the PDCCH region scale value is less than the threshold value.

Moreover, the present embodiment may be combined with Embodiment 2.

Embodiment 6

As described above in the embodiments, a subframe in which substantially no decrease in the degree of freedom in scheduling (that is, DCI mapping) occurs even if the R-PDCCH region is not configured as the mapping region of the DCI (or the blind decoding target region) is different depending on the network operation mode. In view of this, in Embodiment 6, two types of subframe subsets (hereinafter, respectively referred to as "subset 1" and "subset 2" in some cases) are set. In the subset 1, the R-PDCCH region is not configured as the mapping region of the DCI (or the blind decoding target region). In the subset 2, the R-PDCCH region is configured as the mapping region of the DCI (or the blind decoding target region) (that is, only the PDCCH region is configured as the mapping region of the DCI (or the blind decoding target region)). The basic configurations of a base station and a terminal of Embodiment 6 are common to those of Embodiment 1, and hence the configurations are described with reference to FIGS. 7 and 9.

In base station 100 of Embodiment 6, transmission region configuration section 131 configures a plurality of subframe subsets (that is, for example, the subframe subset 1 and the subframe subset 2) on a cell basis. For example, among ten subframes that form one frame, subframes 0, 1, 4, 5, 8, and 9 are configured as the subset 1, and subframes 2, 3, 6, and 7 are configured as the subset 2. Alternatively, transmission region configuration section 131 may configure the plurality of subframe subsets on a MBSFN subframe basis or on a four-frame basis corresponding to an ABS setting unit. In this case, there is an effect of enabling an operation equivalent to those of Embodiments 3 to 5 in accordance with the network operation mode.

Further, in the subset 1, transmission region configuration section 131 does not configure the R-PDCCH region as the mapping region of the DCI, and configures only the PDCCH region as the mapping region of the DCI. Specifically, if the current subframe is a subframe included in the subset 1, transmission region configuration section 131 configures only the PDCCH region as the mapping region of the DCI to every terminal 200. Further, if the current subframe is a subframe included in the subset 2, transmission region configuration section 131 configures both the PDCCH region and the R-PDCCH region as the mapping region of the DCI to every terminal 200.

In terminal 200 of Embodiment 6, configuration information receiving section 206 extracts subframe configuration information from the reception signal input from demultiplexing section 205, and outputs the subframe configuration information to PDCCH receiving section 207.

PDCCH receiving section 207 determines whether the current subframe (that is, the processing target subframe) is a subframe included in the subset 1 or a subframe included in the subset 2, on the basis of the subframe configuration information. Then, if the current subframe (that is, the processing target subframe) is the subset 1, PDCCH receiving section 207 identifies only the PDCCH region as the blind decoding target region. On the other hand, if the current subframe (that is, the processing target subframe) is the subset 2, PDCCH receiving section 207 identifies both the PDCCH region and the R-PDCCH region as the blind decoding target region.

As described above, according to the present embodiment, in base station 100, transmission region configuration section 131 configures the plurality of subframe subsets. In a first subframe subset (here, the subset 1), transmission region configuration section 131 does not configure the R-PDCCH region as the mapping region of the DCI, and configures only the PDCCH region as the mapping region of the DCI.

Further, according to the present embodiment, in terminal 200, in the first subframe subset (here, the subset 1), PDCCH receiving section 207 identifies only the PDCCH region as the detection target resource region (that is, the blind decoding target region).

Accordingly, in various operation modes, the plurality of subframe subsets can be appropriately set so as to suit subframe properties and the like, and the number of blind decoding operations of the terminal can be reduced without substantially any decrease in the degree of freedom in scheduling. As a result, the erroneous detection rate can be reduced.

Note that, in the above description, in the first subframe subset (here, the subset 1), only the PDCCH region is configured as the mapping region of the DCI (or the blind decoding target region). However, the present embodiment is not limited thereto, and can be modified in the following manner.

Modified Example 1

In the first subframe subset (here, the subset 1), an R-PDCCH region that is more limited than the R-PDCCH region in a second subframe subset (here, the subset 2) may be configured as the mapping region of the DCI (or the blind decoding target region), in addition to the PDCCH region.

Even in this case, the number of blind decoding operations on the R-PDCCH can be reduced in the first subframe subset (here, the subset 1), compared with the second subframe subset (here, the subset 2), and hence the erroneous detection rate can be reduced.

Modified Example 2

In the first subframe subset (here, the subset 1), only the PDCCH region may be configured as the mapping region of the DCI (or the blind decoding target region), and, in the second subframe subset (here, the subset 2), only the R-PDCCH region may be configured as the mapping region of the DCI (or the blind decoding target region). Even in this case, the number of blind decoding operations on the R-PDCCH can be reduced so as to suit subframe properties, and hence the erroneous detection rate can be reduced. Moreover, the terminal does not need to perform blind decoding on both the PDCCH region and the R-PDCCH region in a subframe, and hence Modified Example 2 can be carried out using a receiving circuit similar to that of LTE.

Modified Example 3

The number of blind decoding operations on the R-PDCCH and the PDCCH (or the amount of the mapping region of the DCI) may be set for each subframe subset. Even in this case, an effect of reducing the erroneous detection rate due to a reduction in the number of blind decoding operations of the terminal can be obtained similarly to the above.

According to the present embodiment and Modified Examples 1 to 3, in short, it is advisable that the number of decoding target unit region candidates that form the mapping region in the R-PDCCH region be set to be smaller in a subset other than a given subframe subset than in the given subframe subset.

Other Embodiments (1) In the embodiments described above, a radio network temporary identifier (RNTI) such as a cell-RNTI (C-RNTI) may be used as a terminal ID.

(2) The expression of a "DCI format common to all the terminals" in the embodiments described above can also be interpreted as a "DCI format independent of a transmission mode".

(3) In the embodiments described above, the format independent of a terminal transmission mode is described as the DCI 0/1A, but is not limited thereto, and may be any format as long as the format can be used independently of the terminal transmission mode. Further, a format other than the DCIs 1, 2, 2A, 2B, 2C, 2D, 0A, and 0B may be used as the DCI dependent on a transmission mode. Further, the uplink or downlink transmission mode may include a consecutive band allocation transmission mode. In a terminal to which this transmission mode is configured, the DCIs dependent on this transmission mode are the DCI 0 (uplink) and the DCI 1A (downlink) In this case, the DCI format common to all the terminals is the same as the format dependent on a transmission mode, and hence, in a UE-SS, blind decoding may be performed on one type of format in each of the uplink and the downlink Note that, in the case of consecutive band allocation in both the uplink and the downlink, the number of blind decoding target formats is one in total. The DCI 0/1A is set to the DCI dependent on a transmission mode with a larger search space, thus preventing an increase in block rate to a terminal to which the PDCCH can be allocated only using the DCI 0/1A due to its original poor propagation path conditions.

(4) The CCEs and the R-CCEs in the embodiments described above are logical resources. In the case where the CCEs and the R-CCEs are arranged in actual physical time/frequency resources, the CCEs are arranged so as to be scattered over all bands, and the R-CCEs are arranged so as to be scattered over a given RB. Further, even other arrangement methods can similarly produce effects of the claimed invention.

(5) In the embodiments described above, in addition to the R-PDCCH, the claimed invention can also be applied to a control channel that is transmitted using a frequency resource with which data may be transmitted, so that similar effects can be obtained.

(6) In Embodiments 2 to 6, in a subframe other than a given subframe (for example, the MBSFN subframe), both the PDCCH region and the R-PDCCH region are configured as the mapping region of the DCI to every terminal, but the claimed invention is not limited thereto. For example, each terminal may be configured in advance as to whether or not the R-PDCCH should be configured as the decoding target region, and both the PDCCH region and the R-PDCCH region may be configured as the mapping region of the DCI to only terminal 200 thus configured.

(7) In the embodiments described above, description is given assuming that the information concerning the scale of the PDCCH region is notified using the PCFICH from base station 100 to terminal 200, but the claimed invention is not limited thereto. The information concerning the scale of the PDCCH region may be notified using a channel other than the PCFICH or other information.

(8) In the embodiments described above, description is given, as an example, of the case where the information concerning the scale of the PDCCH region is the number of OFDM symbols of the PDCCH region, but the claimed invention is not limited thereto. The information concerning the scale of the PDCCH region may be an OFDM symbol number at which the PDSCH starts (that is, if the PDCCH region corresponds to three OFDM symbols, the OFDM symbol number is 4). In short, any information can be adopted as long as the information concerns the scale of the PDCCH region.

(9) The given subframe in Embodiment 2 may be a special subframe (SS) of TDD. The SS of TDD has a gap (non-transmission section) for switching between the downlink and the uplink. For this reason, compared with a normal subframe, the number of REs usable for the R-PDCCH is smaller, and the R-PDCCH efficiency is lower. Accordingly, in the SS of TDD, the R-PDCCH is considered to be less likely to be used. In view of this, in the SS of TDD, blind decoding is not performed on the R-PDCCH, or the number of blind decoding operations on the R-PDCCH is set to be smaller than that in the normal subframe. As a result, the number of blind decoding operations on the R-PDCCH can be reduced without substantially any restriction on a scheduler.

Further, in the SS of TDD, blind decoding may not be performed on DCI directed to DL allocation, or the number of blind decoding operations thereon may be reduced. In the SS, the number of REs directed to DL data is small, and hence the DL data is less likely to be allocated to the SS. In comparison, for the UL, DL subframes are limited in the SS of TDD, and hence allocation to another UL subframe may be performed. Consequently, UL data is likely to be allocated to the SS. Accordingly, in the SS of TDD, blind decoding is not performed on DCI directed to DL allocation, whereby the number of blind decoding operations can be reduced without substantially any restriction on a scheduler.

(10) In Embodiments 2 to 6, in the given subframe, whether or not blind decoding should be performed on the R-PDCCH may be set for each DCI format. For example, in Embodiment 3, in the macrocell ABS, data may not be transmitted for the downlink in order to avoid interference with the pico cell, and only uplink data resource allocation may be performed in some cases. Consequently, the R-PDCCH is highly likely to be used for uplink data resource allocation. Accordingly, blind decoding of only the DCI formats for downlink data resource allocation (DCI formats 1, 1A, 1B, 1C, 2, 2A, 2B, 2C, 3, and 3A) is not performed, whereas blind decoding of the DCI formats for uplink data resource allocation (DCI formats 0 and 4) is performed. As a result, the number of blind decoding operations on the R-PDCCH can be reduced without substantially any restriction on scheduling.

(11) In Embodiments 2 to 6, the configuration of a subframe is configured on a cell basis, but the claimed invention is not limited thereto. The configuration of a subframe may be configured on a terminal basis.

(12) The DMRS in the embodiments described above may also be referred to as UE-specific reference signal.

(13) The number of blind decoding operations in the embodiments described above may be used as an equivalent of the size of a search space.

(14) Although antennas have been introduced in the embodiments described above, an antenna port is also applicable to the claimed invention.

An antenna port refers to a logical antenna composed of one or more physical antennas. In other words, an antenna port does not necessarily refer to one physical antenna and may refer to an antenna array composed of a plurality of antennas.

For example, 3GPP LTE does not specify the number of physical antennas in an antenna but specifies a minimum unit a base station can transmit different reference signals.

An antenna port may also be specified as a minimum unit which multiplies weights of precoding vectors.

(15) In the PDCCH region described above, other control channels and reference signals such as a PHICH and a PCFICH may be transmitted in addition to the PDCCH. Further, the PDCCH region can also be defined as a resource region in which a data channel is not arranged.

(16) In the embodiments described above, the CFI value may be controlled or notified dynamically (that is, on a subframe basis), and may be controlled or notified semi-statically (that is, on the basis of several tens of subframes according to a notification of an upper layer).

(17) In the embodiments described above, for every terminal, it is determined whether or not the R-PDCCH should be added to a search space (that is, whether or not the terminal should perform blind decoding on the R-PDCCH), depending on whether or not the PDCCH region scale value (that is, the CFI) is equal to or more than the threshold value, but the claimed invention is not limited thereto. Then, for only a terminal in which both the R-PDCCH and the PDCCH are configured as blind decoding candidates, it may be determined whether or not the terminal should perform blind decoding on the R-PDCCH, depending on whether or not the PDCCH region scale value (that is, the CFI) is equal to or more than the threshold value. In this case, the configuration section configures in advance, for each terminal, whether only the PDCCH region should be configured as a blind decoding candidate or both the R-PDCCH and the PDCCH should be configured as blind decoding candidates, and notifies the setting result to each terminal as control information (RRC information) of the upper layer. If whether only the PDCCH region should be configured as a blind decoding candidate or both the R-PDCCH and the PDCCH should be configured as blind decoding candidates is set and notified in advance, only a terminal that needs to transmit control information using the R-PDCCH, for example, a terminal at a cell edge, performs blind decoding on the R-PDCCH, and hence a false alarm can be reduced.

(18) In the foregoing embodiments, the claimed invention is configured with hardware by way of example, but the claimed invention may also be provided by software in cooperation with hardware.

(19) The functional blocks used in the description of the respective embodiments may be typically implemented as an LSI, an integrated circuit. They may be individual chips, or some of or all of them may be integrated into a single chip. "LSI" is used here, but "IC," "system LSI," "super LSI," or "ultra LSI" may also be adopted depending on the degree of integration.

Alternatively, circuit integration may also be implemented using a dedicated circuit or a general processor other than an LSI. After an LSI is manufactured, an FPGA (field programmable gate array) or a reconfigurable processor which enables the reconfiguration of connection and setting of circuit cells in an LSI may be used.

If integrated circuit technology appears to replace LSIs as a result of the advancement of semiconductor technology or other derivative technology, the functional blocks could be integrated using this technology. Biotechnology can also be applied.

The disclosure of the specification, the drawings, and the abstract included in Japanese Patent Application No. 2010-199882, filed on Sep. 7, 2010, and Japanese Patent Application No. 2011-153663, filed on Jul. 12, 2011, is incorporated herein by reference in its entirety.

INDUSTRIAL APPLICABILITY

A base station, a terminal, a transmission method, and a reception method according to the claimed invention are useful to reduce erroneous detection of control information, to thereby prevent a decrease in system throughput.

REFERENCE SIGNS LIST

100 Base station
101 Configuration section
102 Control section
103 Search space configuration section
104 PDCCH generating section
105, 106, 107 Coding/modulating section
108 Allocating section
109 PCFICH generating section
110 Multiplexing section
111, 213 IFFT section
112, 214 CP adding section
113, 215 RF transmitting section
114, 201 Antenna
115, 202 RF receiving section
116, 203 CP removing section
117, 204 FFT section
118 Extracting section
119 IDFT section
120 Data receiving section
121 ACK/NACK receiving section 131 Transmission region configuration section
132 Transmission mode configuration section
200 Terminal
205 Demultiplexing section
206 Configuration information receiving section
207 PDCCH receiving section
208 PDSCH receiving section
209, 210 Modulating section
211 DFT section
212 Mapping section
216 PCFICH receiving section

The invention claimed is:

1. A communication system comprising:
a base station includes a transmitting circuitry which, in operation, transmits downlink control information to a terminal apparatus; and
wherein the terminal apparatus includes:
  a receiver which, in operation, receives the downlink control information that is:
    selectively mapped to resources of a first resource region and a second resource region included in a first type of subframe, the first resource region being available for a downlink control channel and a downlink data channel, the second resource region being available for the downlink control channel; or
    selectively mapped to resources of the second resource region included in a second type of subframe, the second type of subframe having a gap period between a downlink period and an uplink period in time division duplex (TDD) communications; and
  a decoder which, in operation, identifies both of the first resource region and the second resource region or only the second resource region as a region for decoding, and decodes the identified first and second resource regions or the identified second resource region to obtain the downlink control information,
wherein whether to decode both the first resource region and the second resource region or to decode only the second resource region is configured per subframe.

2. The communication system according to claim 1, wherein
the first resource region is an extended Physical Downlink Control Channel (extended PDCCH) that is defined in a Physical Downlink Shared Channel (PDSCH) which follows a Physical Downlink Control Channel (PDCCH) in a time domain; and
the second resource region is the PDCCH.

3. The communication system according to claim 2, wherein
the extended PDCCH is a region defined in a data region of the first type of subframe.

4. The communication system according to claim 1, wherein
the selective mapping of the downlink control information to the first type of subframe or to the second type of subframe is switched based on whether a number of OFDM symbols used for the downlink control channel is smaller than a specified number or the number of OFDM symbols is equal to or larger than the specified number.

5. The communication system according to claim 1, wherein
whether to decode both of the first resource region and the second resource region or to decode only the second resource region is configured per subset of subframes.

6. The communication system according to claim 1, wherein
the receiver further receives subframe pattern information that indicates the first type of subframe where the downlink control information can be mapped in the first resource region, the subframe pattern information being transmitted by a base station in a same period as a measSubframePattern; and
the decoder identifies the region for decoding based on the received subframe pattern information.

7. A communication method comprising:
transmitting by a base station, downlink control information to a terminal apparatus;
receiving by the terminal apparatus, the downlink control information that is:
  selectively mapped to resources of a first resource region and a second resource region included in a first type of subframe, the first resource region being available for a downlink control channel and a downlink data channel, the second resource region being available for the downlink control channel; or
  selectively mapped to resources of the second resource region included in a second type of subframe, the second type of subframe having a gap period between a downlink period and an uplink period in time division duplex (TDD) communications;
identifying both of the first resource region and the second resource region or only the second resource region as a region for decoding, and
decoding the identified first and second resource regions or the identified second resource region to obtain the downlink control information,
wherein whether to decode both the first resource region and the second resource region or to decode only the second resource region is configured per subframe.

* * * * *